US008452101B2

(12) United States Patent
Nakamura et al.

(10) Patent No.: US 8,452,101 B2
(45) Date of Patent: May 28, 2013

(54) FEATURE EXTRACTION METHOD, AND IMAGE RECOGNITION METHOD AND FEATURE DATABASE CREATION METHOD USING THE SAME

(75) Inventors: Masaki Nakamura, Okazaki (JP); Tomoaki Ishikawa, Okazaki (JP); Koichi Nakao, Shinagawa (JP); Motoki Kanba, Okazaki (JP); Osamu Aisaka, Okazaki (JP); Kiyokazu Okada, Miyoshi (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 435 days.

(21) Appl. No.: 12/451,078

(22) PCT Filed: May 30, 2008

(86) PCT No.: PCT/JP2008/060503

§ 371 (c)(1),
(2), (4) Date: Jul. 23, 2010

(87) PCT Pub. No.: WO2008/150002

PCT Pub. Date: Dec. 11, 2008

(65) Prior Publication Data

US 2011/0044543 A1 Feb. 24, 2011

(30) Foreign Application Priority Data

May 31, 2007 (JP) ................................ 2007-145746

(51) Int. Cl.
*G06K 9/66* (2006.01)

(52) U.S. Cl.
USPC .......................................................... 382/190

(58) Field of Classification Search
USPC ................ 382/103–104, 115–118, 128, 133, 382/157–160, 173, 177, 181, 190–195, 206, 382/224–230, 291–292, 305–306; 348/86–87, 348/92–95, 113–119, 135, 142–143, 148–149, 348/152–155; 701/1, 20–23, 36, 44, 57, 77, 701/117; 706/20, 25
See application file for complete search history.

(56) References Cited

U.S. PATENT DOCUMENTS 5,378,969 A 1/1995 Haikawa
5,638,116 A * 6/1997 Shimoura et al. ............ 348/118

(Continued)

FOREIGN PATENT DOCUMENTS

EP 0 681 230 A1 11/1995
JP A-2006-209510 8/2006

OTHER PUBLICATIONS

Heimes et al.; "Automatic Generation of Intersection Models from Digital Maps for Vision-Based Driving on Innercity Intersections;" *IEEE Intelligent Vehicles Symposium*; 2000; pp. 498-503.

(Continued)

*Primary Examiner* — Jose Couso
(74) *Attorney, Agent, or Firm* — Oliff & Berridge, PLC

(57) ABSTRACT

A feature extraction method includes: the step of grouping a cluster of features, in which an internal of the respective features is less than or equal to a predetermined grouping interval, to form a feature group, for a plurality of features of which feature information including at least information of a position and a feature type is included in a predetermined feature information storage unit; the step of excluding the feature, not suitable for use in an image recognition process of the feature with respect to image information, from the cluster of the features within the feature group; and the step of extracting a part or all of one or more of the features within the feature group remaining as a result of the exclusion step as a target feature suitable for the use in the image recognition process.

18 Claims, 18 Drawing Sheets

U.S. PATENT DOCUMENTS

| | | | | |
|---|---|---|---|---|
| 5,850,470 | A * | 12/1998 | Kung et al. | 382/157 |
| 5,978,498 | A * | 11/1999 | Wilhelm et al. | 382/133 |
| 7,295,682 | B2 * | 11/2007 | Otsuka et al. | 382/103 |
| 7,668,341 | B2 * | 2/2010 | Miyajima et al. | 382/104 |
| 2006/0228000 | A1 | 10/2006 | Miyajima et al. | |
| 2006/0244830 | A1 | 11/2006 | Davenport et al. | |

OTHER PUBLICATIONS

Apr. 4, 2013 European Office Action issued in EP 08 765 304.4.

Heimes F. et al., "Towards Active Machine-Vision-Based Driver Assistance for Urban Areas," International Journal of Computer Vision, Apr. 12, 2002, pp. 1-34.

* cited by examiner

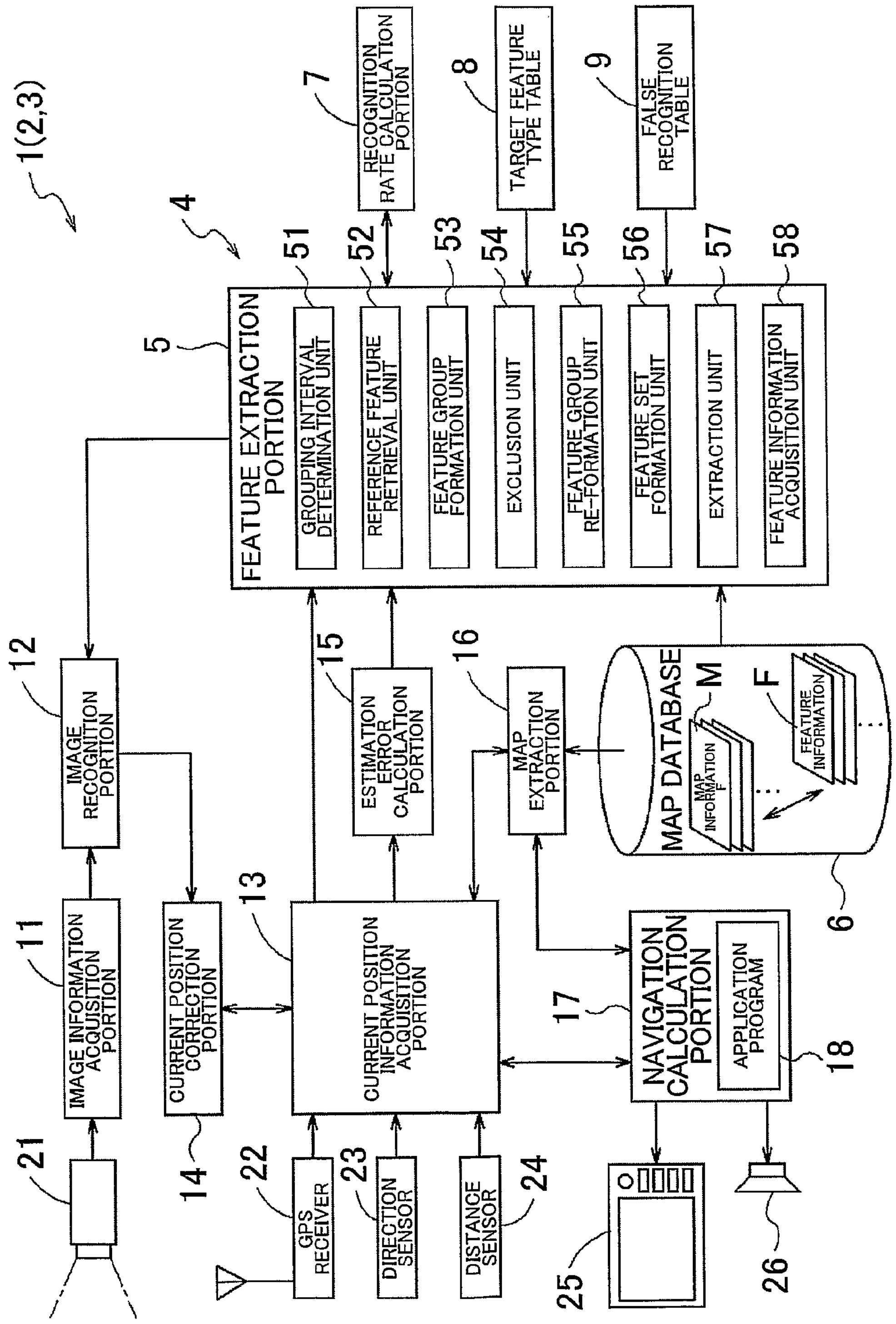

F I G . 1
1(2,3)
4
5
FEATURE EXTRACTION PORTION
GROUPING INTERVAL DETERMINATION UNIT
REFERENCE FEATURE RETRIEVAL UNIT
FEATURE GROUP FORMATION UNIT
EXCLUSION UNIT
FEATURE GROUP RE-FORMATION UNIT
FEATURE SET FORMATION UNIT
EXTRACTION UNIT
FEATURE INFORMATION ACQUISITION UNIT
51
52
53
54
55
56
57
58
7
RECOGNITION RATE CALCULATION PORTION
8
TARGET FEATURE TYPE TABLE
9
FALSE RECOGNITION TABLE
12
IMAGE RECOGNITION PORTION
11
IMAGE INFORMATION ACQUISITION PORTION
CURRENT POSITION CORRECTION PORTION
14
13
CURRENT POSITION INFORMATION ACQUISITION PORTION
15
ESTIMATION ERROR CALCULATION PORTION
16
MAP EXTRACTION PORTION
MAP DATABASE
M
F
MAP INFORMATION
FEATURE INFORMATION
6
17
NAVIGATION CALCULATION PORTION
APPLICATION PROGRAM
18
21
22
GPS RECEIVER
23
DIRECTION SENSOR
24
DISTANCE SENSOR
25
26

F
F
F
F
s
s
s
n
s
n
n
k
k
k
k
k
k
m3
m2
m1

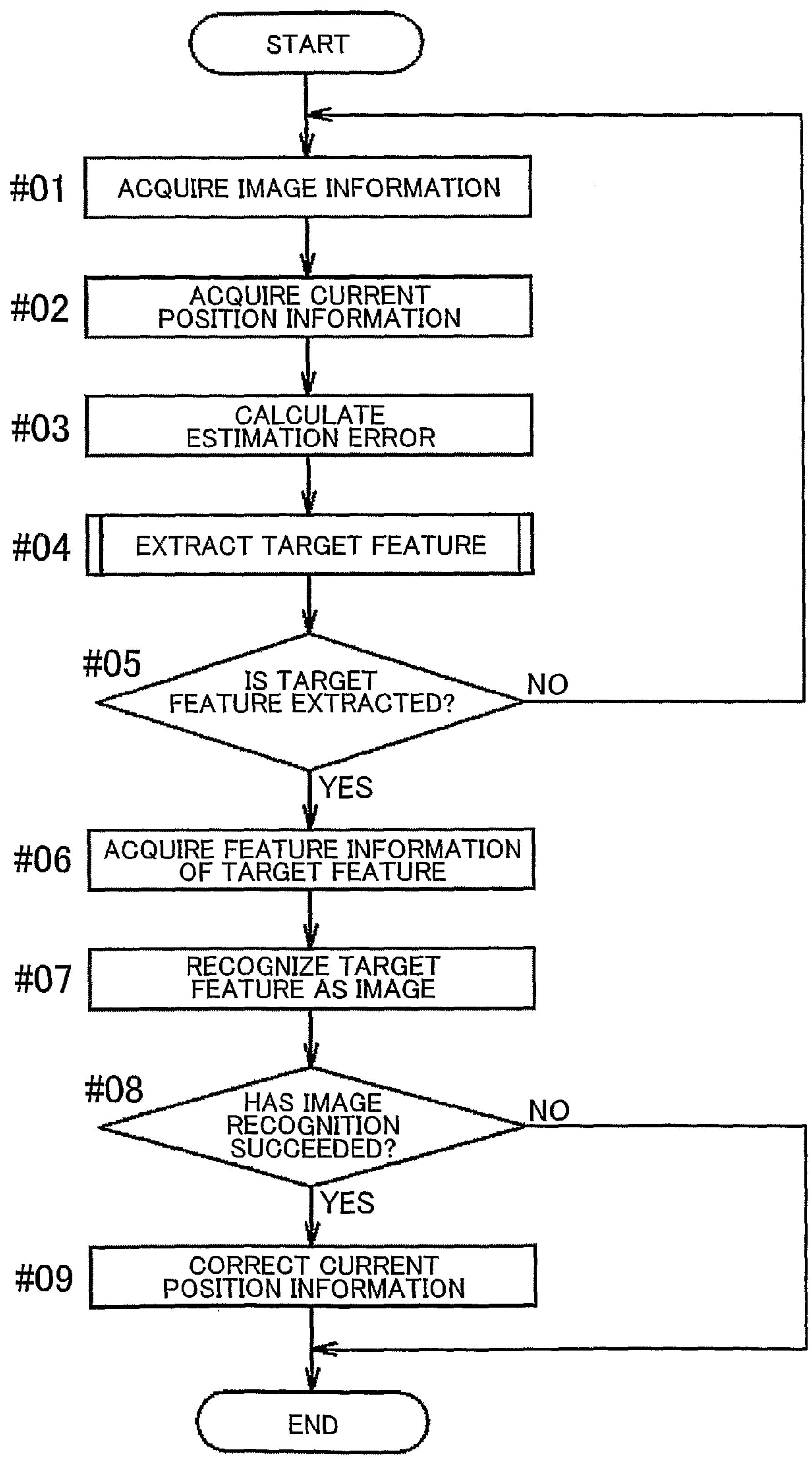
F I G . 4
START
01
ACQUIRE IMAGE INFORMATION
02
ACQUIRE CURRENT POSITION INFORMATION
03
CALCULATE ESTIMATION ERROR
04
EXTRACT TARGET FEATURE
05
IS TARGET FEATURE EXTRACTED?
NO
YES
06
ACQUIRE FEATURE INFORMATION OF TARGET FEATURE
07
RECOGNIZE TARGET FEATURE AS IMAGE
08
HAS IMAGE RECOGNITION SUCCEEDED?
NO
YES
09
CORRECT CURRENT POSITION INFORMATION
END

FEATURE EXTRACTION METHOD, AND IMAGE RECOGNITION METHOD AND FEATURE DATABASE CREATION METHOD USING THE SAME

TECHNICAL FIELD

The present invention relates to a feature extraction method for extracting one or more target features suitable for use in an image recognition process of a feature with respect to image information from a plurality of features of which feature information is stored in a predetermined feature information storage unit, to an image recognition method and a feature database creation method using the same, and further to a program and a device for realizing the methods.

BACKGROUND ART

Along with an improvement in imaging devices and image recognition technology in recent years, image recognition devices which perform an image recognition of a road marking (paint marking) of a feature, e.g., a segment line, a stop line, and a crosswalk, in the vicinity of a current position using image information taken by an on-vehicle camera have been developed for correction of current position information, vehicle control, and the like. In order to improve a recognition rate of the image recognition process of the feature in the vicinity of the current position, there is technology of an image recognition device (for example, see Japanese Patent Application Publication No. 2006-209510) which performs the image recognition process of the feature by acquiring information of the feature in the vicinity of the current position from a feature information storage unit storing feature information such as a map database and cross-checking the acquired feature information with image information, instead of performing the image recognition process only by image information.

DISCLOSURE OF THE INVENTION

In the image recognition device described above, each of all of the features in the vicinity of the current position to be included in the image information may be subjected to the image recognition process. In this case, all of the features along a travel direction from the current position are sequentially extracted from the feature information storage unit, and the feature information of the extracted feature is used for the image recognition process. However, a shape, color, and the like of some of the features such as the road marking is liable to a false recognition as another feature, difficult to be recognized as an image, and the like. In such cases, subjecting each of all of the features to the image recognition process may cause the false recognition with another feature which is adjacent with a relatively narrow interval, and is inefficient due to a large calculation load of the image recognition process. Making a database of information of all of the features present along a road is inefficient also for creating a feature database used for the image recognition process.

The present invention has been made in view of the problems described above, and has an object of providing a feature extraction method which enables a reduction of the false recognition and an efficient image recognition process as well as an efficient production of the feature database used for the image recognition process by appropriately extracting one or more features suitable for use in the image recognition process, an image recognition method and a feature database creation method using the same, and further a program and a device for realizing the methods.

In order to achieve the above-described object, a characteristic configuration of a feature extraction method according to the present invention includes: grouping a cluster of features, in which an interval of the respective features is less than or equal to a predetermined grouping interval, to form a feature group, for a plurality of features of which feature information including at least information of a position and a feature type is stored in a predetermined feature information storage unit; excluding a feature not suitable for use in an image recognition process of the feature with respect to image information, from the cluster of the features within the feature group; and extracting a part or all of one or more of the features within the feature group remaining as a result of the excluding as a target feature suitable for the use in the image recognition process.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged with a relatively narrow interval of less than or equal to the grouping interval. Therefore, when the target feature extracted with the method is used in the image recognition process, an occurrence of false recognition with another adjacent feature can be reduced, and a calculation load for the image recognition process with respect to the image information can be reduced to efficiently perform the image recognition process. When the target feature extracted using the method is used to create a feature database, unnecessary feature information can be prevented from being stored in the database, whereby the feature database suitable for use in the image recognition process can be created efficiently.

It is preferable that the feature extraction method further include re-forming a feature group between the excluding and the extracting, the re-forming including grouping the cluster of the features, in which the interval of the respective features is less than or equal to the predetermined grouping interval, to form a new feature group and forming a new feature group individually for each feature which has not been grouped, for one or more of the features within the feature group remaining as the result of the excluding, a part or all of one or more of the features within the feature group formed at the re-forming being extracted as the target feature at the extracting.

With this configuration, even when a feature interval of a part of the cluster of the features forming the feature group has become larger than the grouping interval as the result of the exclusion of the feature not suitable for use in the image recognition process at the excluding, the new feature group can be formed accordingly. Thus, the features arranged at an interval larger than the grouping interval can belong to different feature groups, whereby an opportunity of the image recognition process of the target feature can be increased while reducing the occurrence of the false recognition with another adjacent feature.

It is further preferable that the feature extraction method further include forming a feature set before the extracting, the forming including forming the cluster of the features, in which the interval of the respective features is less than or equal to the predetermined grouping interval, of the same feature type into a set as a feature set and forming a feature set individually for each feature which has not been formed into the set, for one or more of the features within the feature group, as the feature set, one feature set being selected from within the feature group, and one or more of the features forming the selected feature set being extracted as the target feature at the extracting.

Note that, in the present application, phrases "forming the cluster of the features into a set" and "grouping the cluster of the features" are expressed differently only for the sake of distinguishing the process of forming the feature set and the process of forming the feature group, and both are used as the same meaning of forming the cluster of the features into one combination. Note that the phrase "forming the cluster of the features into a set" is used for the cluster of features of the same feature type.

With this configuration, the cluster of the features, in which the interval of the respective features is less than or equal to the grouping interval, of the same feature type can be combined as the feature set and regarded as the target feature. Thus, when the target feature extracted with the method is used for the image recognition process, it is possible to perform the image recognition process with the cluster of the features as the set even if the cluster of the features of the same feature type are arranged at a relatively narrow interval, whereby it is possible to reduce the false recognition of one of the features in the cluster with another adjacent feature and to increase the recognition rate of the target feature.

It is preferable that, when the feature set present within the feature group includes a plurality of sets, a feature set which is highest in a recognition rate in the image recognition process be selected from the sets at the extracting.

With this configuration, when the feature set present within the feature group includes a plurality of sets, a feature set suitable for use in the image recognition process can be appropriately selected from the sets, and one or more features suitable for use in the image recognition process can be appropriately extracted as the target feature as a result.

It is preferable that, when a plurality of features, which are of different feature types and have a possibility of being falsely recognized with each other, are present, the excluding include excluding a false recognition feature for excluding a feature of at least one of the feature types from the feature group, as the feature not suitable for the use in the image recognition process.

With this configuration, when the target feature extracted by the method is used for the image recognition process, the false recognition of the features of different feature types with one another can be reduced.

It is preferable that, of the features of the feature types, at least a feature of a feature type which is lower in the recognition rate in the image recognition process be excluded from the feature group at the excluding of the false recognition feature.

With this configuration, when the target feature extracted by the method is used for the image recognition process, a feature of a feature type suitable for use in the image recognition process can be appropriately extracted as the target feature while reducing the false recognition of the features of different feature types with one another.

It is preferable that the feature information include information of feature attributes including the feature types, and the excluding include excluding a non-target feature for excluding, from the feature group, a feature having a feature attribute as a non-target of extraction, as the feature not suitable for the use in the image recognition process.

With this configuration, the feature having a shape or in a state in which, for example, the image recognition is difficult can be appropriately excluded as the non-extraction-target feature to perform the extraction of the target feature.

It is preferable that, when all of the features within the feature group are excluded as the result of the excluding, all of the features within the feature group be extracted as the target feature at the extracting.

With this configuration, when all of the features within the feature group are excluded, the opportunity of the image recognition process of the target feature can be ensured while reducing the occurrence of the false recognition of different features with one another within the feature group, by extracting all of the features within the feature group as the target feature.

At the forming of the feature group, it is preferable to form a feature group individually for each feature for the feature which has not been grouped.

With this configuration, since the feature is independently present with the interval with another feature being greater than or equal to the grouping interval, each feature can be extracted independently as the target feature for the feature having a low possibility of being falsely recognized as the adjacent feature. Thus, the target feature suitable for use in the image recognition process can be appropriately extracted.

It is preferable that a feature, of which a feature type is a stop line, be a reference feature, and a process of sequentially retrieving the adjacent feature along a road from the reference feature to form the feature group be performed at the forming of the feature group.

With this configuration, when the feature extraction method is used in the image recognition process of the feature present on a near side with respect to the stop line for performing some kind of control or the like with the stop line being a target, one or more target features can be appropriately extracted.

At the forming of the feature group, it is preferable that a feature within a predetermined non-extraction-target range from the reference feature be not retrieved.

With this configuration, when the feature extraction method is used in the image recognition process of the feature present on the near side with respect to the stop line for performing some kind of control or the like with the stop line being the target, the target feature can be appropriately extracted in consideration of a distance necessary for performing the control or the like by setting the necessary distance for performing the control or the like as the non-extraction-target range.

It is preferable that the grouping interval be determined according to an estimation error which is an estimation value of an error of current position information obtained separately.

With this configuration, since the grouping interval is determined according to the estimation error of the current position information, the cluster of the features can be grouped according to the estimation error of the current position information. Thus, the occurrence of the false recognition with another adjacent feature can be reduced in the image recognition process of the target feature. When the estimation error of the current position information is small, each of the features can be the target feature of separate image recognition processes, whereby the opportunity of the image recognition process can be increased even with the same number of the features which are possible target features present in the travel direction from the current position.

A characteristic configuration of an image recognition method according to the present invention includes each process of the feature extraction method described above, acquiring image information of the vicinity of a current position, acquiring current position information, acquiring feature information of the target feature from the feature information storage unit, and performing the image recognition process of the target feature with respect to the image information using the feature information of the target feature.

With the characteristic configuration, the feature not suitable for use in the image recognition process is excluded and the target feature is extracted from within the feature group, formed by grouping the cluster of the features in which the interval of the respective features is less than or equal to the predetermined grouping interval. The feature information of the extracted target feature is acquired and is used in the image recognition process. Thus, one or more of the features suitable for use in the image recognition process can be appropriately extracted as the target feature from the cluster of the features arranged at a relatively narrow interval of less than or equal to the grouping interval. Therefore, in the image recognition process of the target feature, the occurrence of the false recognition with another adjacent feature can be reduced, and the calculation load for the image recognition process with respect to the image information can be reduced to perform the image recognition process efficiently.

A characteristic configuration of a feature database creation method according to the present invention includes each process of the feature extraction method described above, acquiring the feature information of the target feature from the feature information storage unit, and storing the feature information acquired at the acquiring of the feature information in a predetermined storage unit.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged at a relatively narrow interval of less than or equal to the grouping interval. Therefore, since unnecessary feature information can be prevented from being stored in the database by storing the extracted target feature in the predetermined storage unit to create the feature database, the feature database suitable for use in the image recognition process can be created efficiently.

A further characteristic configuration of a feature database creation method according to the present invention includes: each process of the feature extraction method described above; sequentially retrieving the target feature extracted at the extracting along the road from the predetermined reference feature; calculating a recognition rate integrated value which is an integrated value of the recognition rate in the image recognition process of one or more of the target features, retrieved at the retrieving, from the reference feature; acquiring feature information of a feature up to the target feature, of which the recognition rate integrated value from the reference feature becomes greater than or equal to a predetermined threshold value, from the feature information storage unit; and storing the feature information acquired at the acquiring of the feature information in a predetermined storage unit.

With the characteristic configuration, a range of the feature of which the feature information is stored in the predetermined storage unit can be appropriately determined such that the integrated value of the recognition rate in the image recognition process of the extracted target feature from the reference feature is greater than or equal to the threshold value. Thus, the feature database storing the feature information of the appropriate range can be created efficiently such that the image recognition process of the target feature can be performed appropriately.

It is preferable that, when the feature extraction method includes the forming of the feature set, the recognition rate and the recognition rate integrated value be calculated with the feature set as a unit at the calculating of the recognition rate, and the feature information of the feature up to the feature set, of which the recognition rate integrated value from the reference feature becomes greater than or equal to the predetermined threshold value, be acquired from the feature information storage unit at the acquiring of the feature information.

With this configuration, even when one or more of the features forming the feature set are extracted as the target feature, the range of the feature of which the feature information is stored in the predetermined storage unit can be appropriately determined based on the feature set.

In order to achieve the above-described object, a characteristic configuration of a feature extraction program according to the present invention causes a computer to execute: grouping a cluster of features, in which an interval of the respective features is less than or equal to a predetermined grouping interval, to form a feature group, for a plurality of features of which feature information including at least information of a position and a feature type is stored in a predetermined feature information storage unit; excluding the feature not suitable for use in an image recognition process of the feature with respect to image in formation, from the cluster of the features within the feature group; and extracting a part or all of one or more of the features within the feature group remaining as a result of the excluding, as a target feature suitable for the use in the image recognition process.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged at a relatively narrow interval of less than or equal to the grouping interval. Therefore, when the target feature extracted by the program is used in the image recognition process, the occurrence of the false recognition with another adjacent feature can be reduced, and the calculation load for the image recognition process with respect to the image information can be reduced to perform the image recognition process efficiently. When the target feature extracted by the program is used to create a feature database, unnecessary feature information can be prevented from being stored in the database, whereby the feature database suitable for use in the image recognition process can be created efficiently.

It is preferable that the feature extraction program further cause a computer to execute re-forming a feature group between the excluding and the extracting, the re-forming including grouping the cluster of the features, in which the interval of the respective features is less than or equal to the predetermined grouping interval, to form a new feature group and forming a new feature group individually for each feature which has not been grouped, for one or more of the features within the feature group remaining as the result of the excluding, a part or all of one or more of the features within the feature group formed at the re-forming of the feature group being extracted as the target feature at the extracting.

With this configuration, even when the feature interval of the part of the cluster of the features forming the feature group has become larger than the grouping interval as the result of the exclusion of the feature not suitable for use in the image recognition process at the excluding, the new feature group can be formed accordingly. Thus, the features arranged at an interval larger than the grouping interval can belong to different feature groups, whereby the occurrence of the false recognition with another adjacent feature can be reduced, and the opportunity of the image recognition process of the target feature can be increased.

It is further preferable that the feature extraction program further cause a computer to execute forming a feature set before the extracting, the forming including forming the cluster of the features, in which the interval of the respective features is less than or equal to the predetermined grouping interval, of the same feature type into a set as a feature set and forming a feature set individually for each feature which has not been formed into the set, for one or more of the features within the feature group, as the feature set, one feature set being selected from within the feature group, and one or more of the features forming the selected feature set being extracted as the target feature at the extracting.

With this configuration, the cluster of the features, in which the interval of the respective features is less than or equal to the grouping interval, of the same feature type can be combined as the feature set as the target feature. Thus, when the target feature extracted by the program is used in the image recognition process, it is possible to perform the image recognition process with the cluster of the features as the set even if the cluster of the features of the same feature type are arranged at a relatively narrow interval, whereby it is possible to reduce the false recognition of one of the features in the cluster with another adjacent feature and to increase the recognition rate of the target feature.

It is preferable that the grouping interval be determined according to the estimation error which is the estimation value of the error of the current position information obtained separately.

With this configuration, since the grouping interval is determined according to the estimation error of the current position information, the cluster of the features can be grouped according to the estimation error of the current position information. Thus, the occurrence of the false recognition with another adjacent feature can be reduced in the image recognition process of the target feature. When the estimation error of the current position information is small, each of the features can be the target feature of separate image recognition processes, whereby the opportunity of the image recognition process can be increased even with the same number of the features which are possible target features present in the travel direction from the current position.

A characteristic configuration of an image recognition program according to the present invention causes a computer to execute each process of the feature extraction program described above, acquiring image information of the vicinity of a current position, acquiring current position information, acquiring feature information of the target feature from the feature information storage unit, and performing the image recognition process of the target feature with respect to the image information using the feature information of the target feature.

With the characteristic configuration, the feature not suitable for use in the image recognition process is excluded and the target feature is extracted from within the feature group, formed by grouping the cluster of the features in which the interval of the respective features is less than or equal to the predetermined grouping interval. The feature information of the extracted target feature is acquired and is used in the image recognition process. Thus, one or more of the features suitable for use in the image recognition process can be appropriately extracted as the target feature from the cluster of the features arranged with the relatively narrow interval of less than or equal to the grouping interval. Therefore, in the image recognition process of the target feature, the occurrence of the false recognition with another adjacent feature can be reduced, and the calculation load for the image recognition process with respect to the image information can be reduced to perform the image recognition process efficiently.

A characteristic configuration of a feature database creation program according to the present invention causes a computer to execute each process of the feature extraction program described above, acquiring the feature information of the target feature from the feature information storage unit, and storing the feature information acquired at the acquiring of the feature information in a predetermined storage unit.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged at a relatively narrow interval of less than or equal to the grouping interval. Therefore, since unnecessary feature information can be prevented from being stored in the database by storing the extracted target feature in the predetermined storage unit to create the feature database, the feature database suitable for use in the image recognition process can be created efficiently.

A further characteristic configuration of a feature database creation program according to the present invention causes a computer to execute: each process of the feature extraction program described above; sequentially retrieving the target feature extracted at the extracting along the road from the predetermined reference feature; calculating a recognition rate integrated value which is an integrated value of the recognition rate in the image recognition process of one or more of the target features, retrieved at the retrieving, from the reference feature; acquiring feature information of a feature up to the target feature, of which the recognition rate integrated value from the reference feature becomes greater than or equal to a predetermined threshold value, from the feature information storage unit; and storing the feature information acquired at the acquiring of the feature information in a predetermined storage unit.

With the characteristic configuration, the range of the feature of which the feature information is stored in the predetermined storage unit can be appropriately determined such that the integrated value of the recognition rate in the image recognition process of the extracted target feature from the reference feature is greater than or equal to the threshold value. Thus, the feature database storing the feature information of the appropriate range can be created efficiently such that the image recognition process of the target feature can be performed appropriately.

In order to achieve the above-described object, a characteristic configuration of a feature extraction device according to the present invention includes: a feature group formation unit which groups a cluster of features, in which an interval of the respective features is less than or equal to a predetermined grouping interval, to form a feature group, for a plurality of features of which feature information including at least information of a position and a feature type is stored in a predetermined feature information storage unit; an exclusion unit which excludes a feature not suitable for use in an image recognition process of the feature with respect to image information, from the cluster of the features within the feature group; and an extraction unit which extracts a part or all of one or more of the features within the feature group remaining as a result of a process performed by the exclusion unit as a target feature suitable for the use in the image recognition process.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged at a relatively narrow interval of less than or equal to the grouping interval. Therefore, when the target feature extracted by the device is used in the image recognition process, the occurrence of the false recognition with another adjacent feature can be reduced, and the calculation load for the image recognition process with respect to the image information can be reduced to perform the image recognition process efficiently. When the target feature extracted by the device is used for creating the feature database, unnecessary feature information can be prevented from being stored in the database, whereby the feature database suitable for use in the image recognition process can be created efficiently.

It is preferable that the feature extraction device further include a feature group re-formation unit which groups the cluster of the features, in which the interval of the respective features is less than or equal to the predetermined grouping interval, to form a new feature group and which forms a new feature group individually for each feature which has not been grouped, for one or more of the features within the feature group remaining as the result of the process performed by the exclusion unit, the extraction unit extracting a part or all of one or more of the features within the feature group formed by the feature group re-formation unit as the target feature.

With this configuration, even when the feature interval of the part of the cluster of the features forming the feature group has become larger than the grouping interval as the result of the exclusion of the feature not suitable for use in the image recognition process by the exclusion unit, the new feature group can be formed accordingly. Thus, the features arranged at an interval larger than the grouping interval can belong to different feature groups, whereby the occurrence of the false recognition with another adjacent feature can be reduced and the opportunity of the image recognition process of the target feature can be increased.

It is further preferable that the feature extraction device further include a feature set formation unit which forms the cluster of the features, in which the interval of the respective features is less than or equal to the predetermined grouping interval, of the same feature type into a set as a feature set and which forms the feature set individually for each feature which has not been formed into the set, for one or more of the features within the feature group, the extraction unit selecting, as the feature set, one feature set from within the feature group and extracting one or more of the features forming the selected feature set as the target feature.

With this configuration, the cluster of the features, in which the interval of the respective features is less than or equal to the grouping interval, of the same feature type can be combined as the feature set as the target feature. Thus, when the target feature extracted by the device is used for the image recognition process, it is possible to perform the image recognition process with the cluster of the features as the set even if the cluster of the features of the same feature type are arranged at a relatively narrow interval, whereby it is possible to reduce the false recognition of one of the features in the cluster with another adjacent feature and to increase the recognition rate of the target feature.

It is preferable that the grouping interval be determined according to the estimation error which is the estimation value of the error of the current position information obtained separately.

With this configuration, since the grouping interval is determined according to the estimation error of the current position information, the cluster of the features can be grouped according to the estimation error of the current position information. Thus, the false recognition with another adjacent feature can be reduced in the image recognition process of the target feature. When the estimation error of the current position information is small, each of the plurality of the features can be the target feature of separate image recognition processes, whereby the opportunity of the image recognition process can be increased even with the same number of the features which are possible target features present in the travel direction from the current position.

A characteristic configuration of an image recognition device according to the present invention includes the feature extraction device described above, an image information acquisition unit which acquires image information of the vicinity of a current position, a current position information acquisition unit which acquires current position information, a feature information acquisition unit which acquires feature information of the target feature from the feature information storage unit, and an image recognition unit which performs the image recognition process of the target feature with respect to the image information using the feature information of the target feature.

With the characteristic configuration, the feature not suitable for use in the image recognition process is excluded and the target feature is extracted from within the feature group, formed by grouping the cluster of the features in which the interval of the respective features is less than or equal to the predetermined grouping interval. The feature information of the extracted target feature is acquired and is used in the image recognition process. Thus, one or more of the features suitable for use in the image recognition process can be appropriately extracted as the target feature from the cluster of the features arranged at a relatively narrow interval of less than or equal to the grouping interval. Therefore, in the image recognition process of the target feature, the occurrence of the false recognition with another adjacent feature can be reduced, and the calculation load for the image recognition process with respect to the image information can be reduced to perform the image recognition process efficiently.

A characteristic configuration of a feature database creation device according to the present invention includes the feature extraction device described above, a feature information acquisition unit which acquires the feature information of the target feature from the feature information storage unit, and a storage processing unit which stores the feature information acquired by the feature information acquisition unit in a predetermined storage unit.

With the characteristic configuration, the feature not suitable for use in the image recognition process is excluded and the target feature is extracted from within the feature group, formed by grouping the cluster of the features in which the interval of the respective features is less than or equal to the predetermined grouping interval. Thus, one or more of the features suitable for use in the image recognition process can be appropriately extracted as the target feature from the cluster of the features arranged at a relatively narrow interval of less than or equal to the grouping interval. Therefore, since unnecessary feature information can be prevented from being stored in the database by storing the extracted target feature in the predetermined storage unit to create the feature database, the feature database suitable for use in the image recognition process can be created efficiently.

A further characteristic configuration of a feature database creation device according to the present invention includes: the feature extraction device described above; a retrieval unit which sequentially retrieves the target feature extracted by the extraction unit along a road from a predetermined reference feature; a recognition rate calculation unit which calculates a recognition rate integrated value which is an integrated value of a recognition rate in the image recognition process of one or more of the target features, retrieved by the retrieval unit, from the reference feature; a feature information acquisition unit which acquires feature information of a feature up to the target feature, of which the recognition rate integrated value from the reference feature becomes greater than or equal to a predetermined threshold value, from the feature information storage unit; and a storage processing unit which stores the feature information acquired by the feature information acquisition unit in a predetermined storage unit.

With the characteristic configuration, the range of the feature of which the feature information is stored in the predetermined storage unit can be appropriately determined such that the integrated value of the recognition rate in the image recognition process of the extracted target feature from the reference feature is greater than or equal to the threshold value. Thus, the feature database storing the feature information of the appropriate range can be created efficiently such that the image recognition process of the target feature can be performed appropriately.

BRIEF DESCRIPTION OF THE DRAWINGS

FIG. 1 is a block diagram showing a schematic configuration of a navigation apparatus including a feature extraction device according to a first embodiment of the present invention;

FIG. 4 is a flowchart showing a processing order of a current position recognition method using an image recognition method according to the first embodiment of the present invention;

BEST MODES FOR CARRYING OUT THE INVENTION

1. First Embodiment

Figure 2:
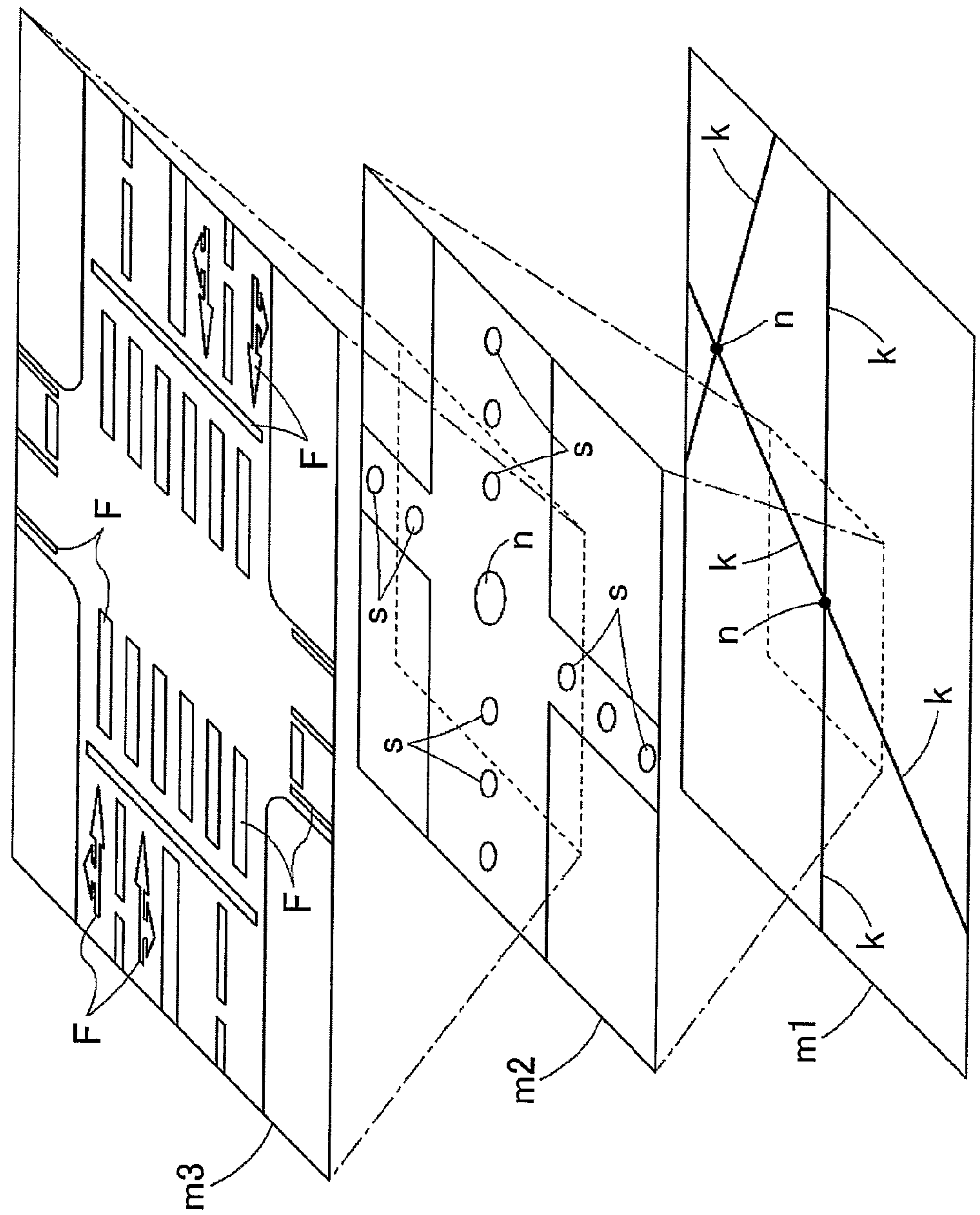
FIG. 2 is an illustrative view showing an example of a configuration of map information and feature information stored in a map database.

A first embodiment of the present invention is first described based on the drawings. FIG. 1 is a block diagram showing a schematic configuration of a navigation apparatus 1 including a feature extraction device 4 according to this embodiment. The navigation apparatus 1 includes an image recognition device 2 including the feature extraction device 4 and a current position recognition device 3. In this embodiment, the navigation apparatus 1 extracts a target feature ft (see FIG. 14) which is present in a travel direction from a current position using a feature extraction portion 5 based on current position information acquired by a current position information acquisition portion 13, and acquires a map database 6 of feature information F of the target feature ft. The feature extraction portion 5 extracts one or more target features ft suitable for use in an image recognition process of a feature with respect to image information, based on the feature information F, from a plurality of features of which the feature information F including at least information of a position and a feature type is stored in the map database 6. The navigation apparatus 1 performs image recognition of the target feature ft by an image recognition portion 12 using the acquired feature information F. The navigation apparatus 1 corrects the current position information based on a result of the image recognition process of the target feature ft and information of the position of the target feature ft included in the feature information F, and acquires highly-accurate current position information. The navigation apparatus 1 performs a navigation process such as a route guidance based on the highly-accurate current position information. Note that an example is described of the navigation apparatus 1 mounted on a vehicle.

As shown in FIG. 1, each of the functional portions of the navigation apparatus 1, specifically, the feature extraction portion 5, an image information acquisition portion 11, the image recognition portion 12, the current position information acquisition portion 13, a current position correction portion 14, an estimation error calculation portion 15, a map extraction portion 16, and a navigation calculation portion 17, is a functional portion, which is mounted with one or both of hardware and software (program), for performing various processes with respect to input data with an arithmetic processing device such as a CPU serving as a central member. Tables included in the navigation apparatus 1, specifically, a target feature type table 8 and a false recognition table 9, are stored in a storage medium such as a read-only memory (ROM). The map database 6 includes a device, including a recording medium in which information is storable and a drive unit thereof, such as a hard disk drive, a DVD drive including a DVD-ROM, and a CD drive including a CD-ROM as a hardware configuration. A configuration of each portion of the navigation apparatus 1 according to this embodiment is described below in detail.

1-1. Map Database

The map database 6 is a database storing a plurality of pieces of map information M divided for each predetermined region and a plurality of pieces of the feature information F associated with the map information. FIG. 2 is an illustrative view showing an example of a configuration of the map information M and the feature information F stored in the map database 6. As shown in the drawing, the map database 6 stores a road network layer m1, a road shape layer m2, and a feature layer m3. In this embodiment, the map database 6 corresponds to a feature information storage unit of the present invention.

The road network layer m1 is a layer showing connection information of roads. Specifically, the road network layer m1 includes information of a large number of nodes n including position information on a map expressed by latitude and longitude and information of a large number of links k which connect two nodes n to form the road. Each link k includes information of a type of road (type such as an expressway, a toll road, a national road, and a prefectural road), and link length as link information thereof. The road shape layer m2 is a layer which is stored in association with the road network layer m1 and shows a shape of the road. Specifically, the road shape layer m2 includes information of a large number of road shape complementary points s, arranged between two nodes n (on the link k) and including the position information on the map expressed by the latitude and longitude, and information of a road width. The map information M is formed by the information stored in the road network layer m1 and the road shape layer m2.

The feature layer m3 is a layer which is associated with the road network layer m1 and the road shape layer m2 and stores information of various features provided on the road or in the vicinity of the road, i.e., the feature information F. The feature of which the feature information F is stored in the feature layer m3 includes a road marking provided on a surface of the road. Examples of the road marking as the feature include, for example, a crosswalk, a stop line, a passing zone marking for each travel direction (a straight arrow, a right turn arrow, and the like) designating the travel direction of each lane, an intersection shape marking (a cross mark, a T mark, and the like), a segment line (a solid line, a dotted line, a double line, and the like) which divides the lanes along the road, a speed indication, and various paint markings such as a zebra zone. Note that various features such as a traffic light, a sign, an overpass, and a tunnel other than the road markings may be included as the feature storing the feature information F.

The feature information F includes information of the position of each feature and information of an attribute as content thereof. The information of the position includes information of a position (latitude and longitude) of a representative point of each feature on the map and information of a direction of each feature. The representative point of the feature is set at a central position in a length direction and a width direction of each feature, for example. In this embodiment, the information of the attribute includes information of the feature type, a figuration of the feature, and a state of the feature. The information of the feature type is information representing the feature type of each feature. Regarding the feature type, the features which basically have the same shape are defined as one feature type. Thus, the information of the feature type is information representing a specific type of the road marking such as the straight arrow, the right turn arrow, the cross mark, the T mark, the stop line, and the crosswalk. The information of the figuration of the feature includes information of a shape, size, and color of each feature. The information of the state of the feature includes information of the state of the feature which influences the image recognition process of each feature, such as a state of wear of each actual feature.

1-2. Current Position Information Acquisition Portion

The current position information acquisition portion 13 functions as a current position information acquisition unit which acquires the current position information showing the current position, i.e., a present position of the vehicle. The current position information acquisition portion 13 is connected with a GPS receiver 22, a direction sensor 23, and a distance sensor 24. The GPS receiver 22 is a device which receives a GPS signal from a global positioning system (GPS) satellite. The GPS signal is normally received every one second and is output to the current position information acquisition portion 13. The current position information acquisition portion 13 can analyze the signal from the GPS satellite received by the GPS receiver 22 and acquire information of the present position (latitude and longitude), the travel direction, a moving speed, and the like of the vehicle. The direction sensor 23 is a sensor which detects the travel direction of the vehicle or a change of the travel direction thereof. The direction sensor 23 is formed of, for example, a gyro-sensor, a geomagnetic sensor, an optical rotation sensor and a rotary variable resistor attached to a rotary portion of a steering wheel, and an angular sensor attached to a wheel portion. The direction sensor 23 outputs a detection result thereof to the current position information acquisition portion 13. The distance sensor 24 is a sensor which detects a vehicle speed and a moving distance of the vehicle. The distance sensor 24 is formed of, for example, a vehicle speed pulse sensor which outputs a pulse signal every time a drive shaft, and a wheel of the vehicle rotates a certain amount, a yaw/G sensor which detects an acceleration of the vehicle, and a circuit which integrates the detected acceleration. The distance sensor 24 outputs information of the vehicle speed and the moving distance as the detection result to the current position information acquisition portion 13.

The current position information acquisition portion 13 performs a calculation of identifying the current position by a known method based on the output from the GPS receiver 22, the direction sensor 23, and the distance sensor 24. The current position information acquisition portion 13 acquires the map information M of the vicinity of the current position extracted from the map database 6 by the map extraction portion 16 and performs a known map-matching based thereon to correct the current position to be on the road shown by the map information M. The information of the current position acquired in this manner is information including an error due to detection accuracy of each sensor 22 to 24. The current position information acquisition portion 13 acquires the current position information including the information of the present position of the vehicle represented by the latitude and longitude and the information of the travel direction of the vehicle by a result of the calculation of identifying the current position described above. The current position information is output to the feature extraction portion 5, the current position correction portion 14, the estimation error calculation portion 15, the map extraction portion 16, and the navigation calculation portion 17.

1-3. Map Extraction Portion

The map extraction portion 16 extracts the map information M of the vicinity of the current position from the map database 6 based on the current position information and outputs the map information M to the current position information acquisition portion 13 for use in a process of the map-matching by the current position information acquisition portion 13. The map extraction portion 16 also extracts the map information M of a region requested by the navigation calculation portion 17 from the map database 6 and outputs the map information M to the navigation calculation portion 17 for use in a navigation process by the navigation calculation portion 17.

1-4. Estimation Error Calculation Portion

The estimation error calculation portion 15 functions as an estimation error calculation unit which obtains an estimation error as an estimation value of the error of the current position information. The estimation error is the estimation value of a maximum error assuming a case with the worst condition of acquisition of the current position information by the current position information acquisition portion 13. In this embodiment, the estimation error is the error of the travel direction of the vehicle (from the current position), and is obtained by an addition of a distance factor error which increases according to the moving distance of the vehicle and a fixed factor error which is irrelevant to the moving distance of the vehicle. Specifically, the estimation error calculation portion 15 calculates and obtains an estimation error E according to a following formula (1).

$$E=aD+b+c \tag{1}$$

The reference symbol D denotes the moving distance of the current position from a predetermined start position and is obtained based on the current position information. The start position is a position shown by the current position information after correction when the current position information is corrected by the current position correction portion 14. The reference symbol a denotes a distance factor error coefficient representing the maximum value per unit distance of the error integrated in proportion to the moving distance D. Examples of an error factor defining the distance factor error coefficient a include the detection error of the distance sensor 24 and the direction sensor 23. The reference symbol b denotes a start error representing the maximum value of the error already included in the current position information at the start position. Examples of an error factor defining the start error b include an error due to image recognition accuracy of the image recognition portion 12, an error due to a displacement of an attachment position and an attachment angle of an image-taking device 21, and an error due to an accuracy of the position information included in the feature information F of the target feature ft (see FIG. 14). The reference symbol c denotes a calculation error representing the maximum value of an error caused due to a calculation process of the estimation error E. Examples of an error factor defining the calculation error c include an error due to a rounding of a value at the time of a calculation of a delay due to processing time. Thus, in this example, the reference symbol aD denotes the distance factor error, and the start error b and the calculation error c are the fixed factor error.

Figure 3:
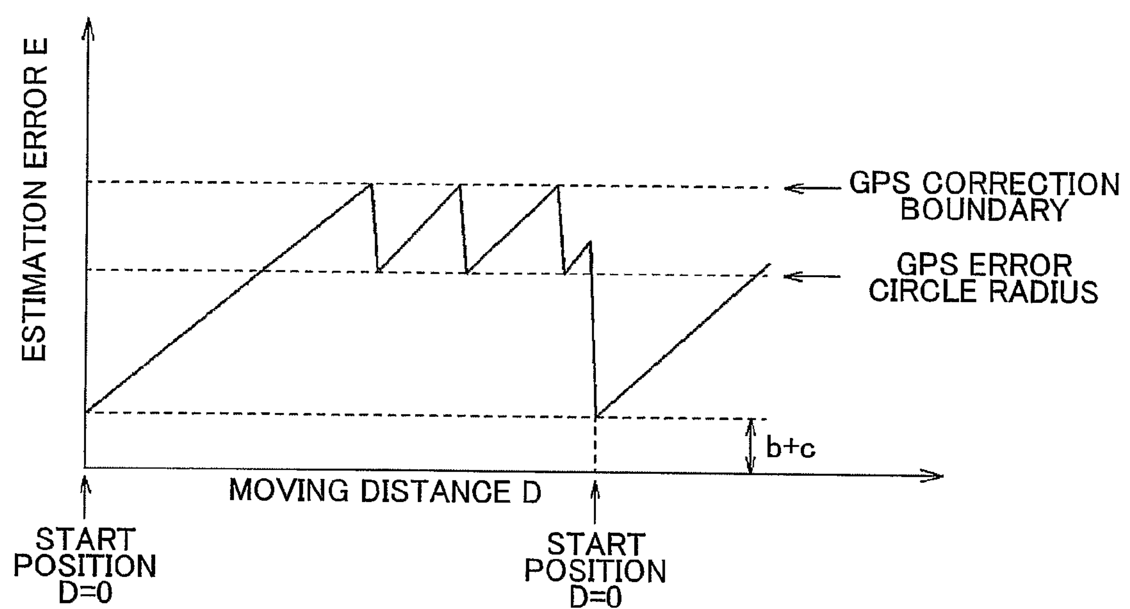
FIG. 3 is a view showing an example of a change of an estimation error when a vehicle travels at an approximately constant speed.

FIG. 3 is a view showing an example of a change of the estimation error E when the vehicle travels at an approximately constant speed. As shown in the drawing, the estimation error E at the start position (D=0) is shown as E=b+c, and the estimation error E increases in proportion to the moving distance D therefrom. Note that, in this example, when the estimation error E increases to exceed an error circle radius of the information of the current position acquired by the GPS receiver 22 and reaches a GPS correction boundary, the current position information is corrected based on the information of the current position acquired by the GPS receiver 22. In this case, the estimation error E is corrected to coincide with the GPS error circle radius. As described later, when the current position information is corrected by the current position correction portion 14 based on an image recognition result of the target feature ft (see FIG. 14) by the image recognition portion 12, the position shown by the current position information after correction becomes the start position and the moving distance D becomes zero. Accordingly, the estimation, error E is shown as E=b+c.

1-5. Feature Extraction Portion

The feature extraction portion 5 extracts one or more target features ft (see FIG. 14) suitable for use in the image recognition process in the image recognition portion 12, based on the feature information F of each feature, from the plurality of the features of which the feature information F is stored in the map database 6. Thus, the feature extraction portion 5 functions as a main configuration of the feature extraction device 4 according to the present invention. Therefore, in this embodiment, the feature extraction portion 5 includes a grouping interval determination unit 51, a reference feature retrieval unit 52, a feature group formation unit 53, an exclusion unit 54, a feature group re-formation unit 55, a feature set formation unit 56, and an extraction unit 57. In this embodiment, the feature extraction portion 5 also includes a feature information acquisition unit 58 for acquiring the feature information F of the target feature ft extracted by the extraction unit 57 from the map database 6. Each unit forming the feature extraction portion 5 is formed of software (program) for operating the arithmetic processing device such as the CPU. The function and the operation of each unit of the feature extraction portion 5 are described later in detail using a flowchart.

Figure 14:
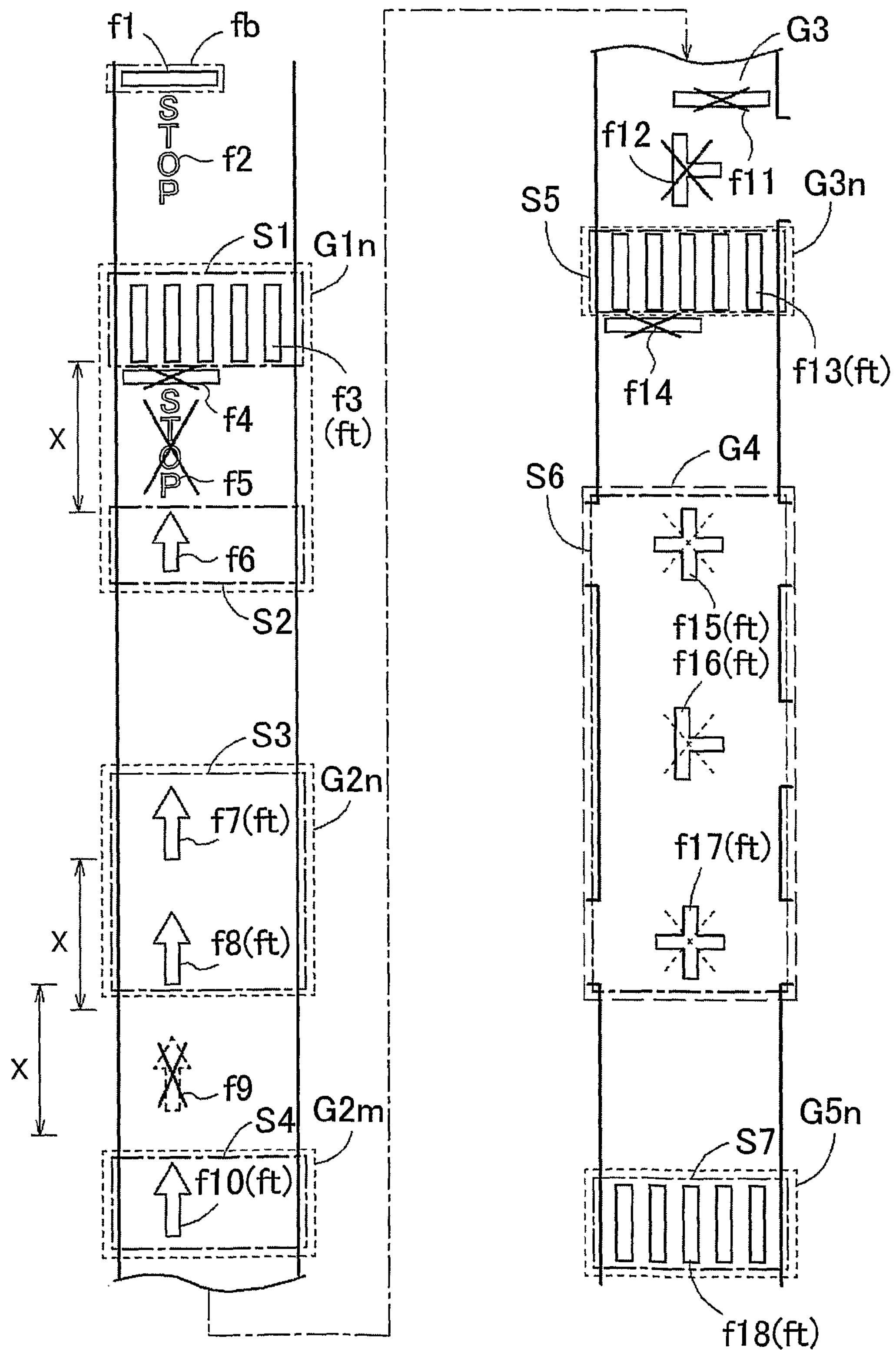
FIG. 14 is an illustrative view for specifically illustrating a process of the feature set formation step and the extraction step.

A recognition rate calculation portion 7 functions as a recognition rate calculation unit which calculates the recognition rate in the image recognition process by the image recognition portion 12 for each of the target features ft extracted by the feature extraction portion 5 and feature sets S (S1 to S7) (see FIG. 14). Note that the feature sets S (S1 to S7) are formed by the feature set formation unit 56 of the feature extraction portion 5 and are formed of one or more features as described later. The function and the operation of the recognition rate calculation portion 7 are also described later in detail using a flowchart in a similar manner to that of each unit of the feature extraction portion 5.

The target feature type table 8 is a table storing information of the feature type, which is to become an extraction target as the target feature ft (see FIG. 14) and is suitable for use in the image recognition process, of the feature types of the plurality of the features of which the feature information F is stored in the map database 6. In this example, the feature types as the extraction target include, for example, the crosswalk, the stop line, the straight and right/left turn arrows, the cross mark, and the T mark. The exclusion unit 54 of the feature extraction portion 5 performs a process of excluding the feature of the feature type which is a non-target of extraction, from feature groups G (G1 to G5) (see FIG. 12) based on the target feature type table 8. Note that the feature groups G (G1 to G5) are formed by the feature group formation unit 53 of the feature extraction portion 5 and are formed of one or more features as described later.

The false recognition table 9 is a table storing information of a combination of the feature types, which have a possibility of being falsely recognized with each other, of the plurality of the feature types as the extraction target. Examples of the combination of the feature types which have the possibility of being falsely recognized with each other include the stop line and the crosswalk, the cross mark and the T mark, and the T mark and the stop line. In this embodiment, the false recognition table 9 also stores information defining which feature type of the feature is to be excluded by the exclusion unit 54, for the combination of the feature types which may be falsely recognized with each other. Which feature type of the feature to exclude is defined in advance based on the recognition rate in the image recognition process by the image recognition portion 12. Specifically, it is defined that at least the feature of the feature type with a lower recognition rate in the image recognition process is excluded. Note that, for the feature types with the same degree of the recognition rate, there may be cases where it is defined that the features of both feature types are excluded. Specifically, for example, it is defined that the stop line is excluded regarding the stop line and the crosswalk, or that the T mark is excluded regarding the stop line and the T mark. Also, for example, it is defined that both are excluded regarding the cross mark and the T mark.

1-6. Image Information Acquisition Portion

The image information acquisition portion 11 functions as an image information acquisition unit which acquires the image information in the vicinity of the current position taken by the image-taking device 21. The image-taking device 21 is a camera or the like including an image-taking element and is provided in a position which enables image-taking of the surface of the road at least in the vicinity of the vehicle (current position). As the image-taking device 21, a back camera or the like may be used, for example. The image information acquisition portion 11 imports the analog image information taken by the image-taking device 21 at predetermined time intervals, and acquires the image information in digital signals by conversion. The time interval of import of the image information may be, for example, approximately 10 to 50 ms. Accordingly, the image information acquisition portion 11 can consecutively acquire the image information of a plurality of frames taken by the image-taking device 21. The acquired image information is output to the image recognition portion 12.

1-7. Image Recognition Portion

The image recognition portion 12 functions as an image recognition unit which performs the image recognition process with respect to the image information acquired by the image information acquisition portion 11. In this embodiment, the image recognition portion 12 performs the image recognition process of the target feature ft using the feature information F of the target feature ft (see FIG. 14) extracted by the feature extraction portion 5. Specifically, the image recognition portion 12 performs a binarization process, an edge detection process, and the like with respect to the image information acquired by the image information acquisition portion 11, and extracts contour information of the feature (road marking) included in the image information. Then, the image recognition portion 12 compares the contour information of the extracted feature and the figuration information included in the feature information F of the target feature ft extracted by the feature extraction portion 5, and determines whether they coincide. When the contour information of the extracted feature and the figuration information included in the feature information F of the target feature coincide, it is determined that the image recognition of the target feature ft has succeeded, and the image recognition result is output to the current position correction portion 14. Note that, when the image recognition of the target feature ft has failed, the image recognition result is not output to the current position correction portion 14, and thus, the correction of the current position information by the current position correction portion 14 is not performed.

When the feature extraction portion 5 extracts the plurality of the features forming one feature set S (S1 to S7) as the target feature ft (see FIG. 14), the image recognition portion 12 performs the image recognition process with the plurality of target features ft as a set (one set). That is, for example, when two features f7 and f8 forming the feature set S3 of an example shown in FIG. 14 are extracted as the target feature ft, the image recognition portion 12 determines that the image recognition of the target feature ft has succeeded under the condition that both of the two features f7 and f8 have been recognized as an image, and performs a process of outputting the image recognition result to the current position correction portion 14. On the other hand, when at least one of the two feature 17 and f8 can not be recognized as an image, it is determined that the image recognition of the target feature ft has failed, and the image recognition result is not output to the current position correction portion 14. In that case, the correction of the current position information by the current position correction portion 14 is also not performed.

1-8. Current Position Correction Portion

The current position correction portion 14 functions as a current position correction unit which corrects the current position information based on a result of the image recognition process by the image recognition portion 12 and the position information of the target feature ft (see FIG. 14) included in the feature information F extracted by the feature extraction portion 5. In this embodiment, the current position correction portion 14 first calculates a positional relation of the vehicle and the target feature ft at the time of acquisition of the image information including the image of the target feature ft, based on the image recognition result of the image recognition portion 12 and the attachment position, the attachment angle, a viewing angle, and the like of the image-taking device 21. Next, the current position correction portion 14 calculates and acquires highly-accurate position information of the vehicle with the position information of the target feature ft (feature information F) serving as a reference, based on a calculation result of the positional relation of the vehicle and the target feature ft and the position information of the target feature ft included in the extracted feature information F extracted by the feature extraction portion 5. Based on the highly-accurate position information of the vehicle acquired in this manner, the current position correction portion 14 corrects the information of the present position of the vehicle included in the current position information acquired by the current position information acquisition portion 13. As a result, the current position information acquisition portion 13 acquires highly-accurate current position information after correction.

When the feature extraction portion 5 extracts the plurality of the features forming one feature set S (S1 to S7) as the target feature ft (see FIG. 14) and the image recognition portion 12 performs the image recognition process of the plurality of target features ft as a set (one set), the current position correction portion 14 calculates the positional relation of the target feature ft, which is in a frontmost location in the travel direction of the vehicle (i.e., the target feature ft of which the image recognition process has been performed last), of the plurality of target features ft and the vehicle at the time of the acquisition of the image information including the image of the target feature ft. The current position correction portion 14 calculates and acquires the highly-accurate position information of the vehicle based on the calculation result and the feature information F of the target feature ft, and performs the process of correcting the current position information.

1-9. Navigation Calculation Portion

The navigation calculation portion 17 is a calculation process unit which operates with an application program 18 for executing a navigation function such as a current position display, a route calculation from a departure point to a destination, a course guidance to the destination, and a destination retrieval. For example, the navigation calculation portion 17 acquires the map information M of the vicinity of the vehicle from the map database 6 using the map extraction portion 16 to display the image of the map on a display device 25, and performs a process of displaying a current position mark based on the current position information to overlap on the image of the map. The navigation calculation portion 17 also performs the course guidance using one or both of the display device 25 and a voice output device 26 based on a route from the departure point to the destination calculated by a known method and the current position information. That is, in this embodiment, the navigation calculation portion 17, the display device 25, and the voice output device 26 function as a guidance information output unit of the navigation apparatus 1. Note that, although omitted in the drawing, the navigation calculation portion 17 is also connected with various known configurations required for a navigation apparatus such as a remote control and a touch panel provided integrally with the display device 25 as a user interface.

1-10. Image Recognition Method and Current Position Recognition Method

Next, an image recognition method executed in the navigation apparatus 1 according to this embodiment and a current position recognition method using the same will be described. Note that, although the image recognition method includes a feature extraction method according to the present invention, the feature extraction method will be described later, and the image recognition method and the current position recognition method will be described first. FIG. 4 is a flowchart showing a processing order of the current position recognition method using the image recognition method according to the present invention.

In the navigation apparatus 1, the image information acquisition portion 11 first acquires the image information in the vicinity of the current position taken by the image-taking device 21 (step #01). Next, the current position information acquisition portion 13 acquires the current position information (step #02). The acquired current position information is information including the information of the present position and the information of the travel direction of the vehicle calculated and identified in the current position information acquisition portion 13 based on the output of the GPS receiver 22, the direction sensor 23, and the distance sensor 24. Next, the estimation error calculation portion 15 calculates the estimation error E of the current position information (step #03). A calculation method of the estimation error E is as described above. Then, the feature extraction portion 5 extracts the target feature ft (see FIG. 14) (step #04) as the target of the image recognition process in the image recognition portion 12, based on the feature information F of each feature f, from the plurality of the features f of which the feature information F is stored in the map database 6. An extraction method of the target feature ft by the feature extraction portion 5 will be described later in detail. When the target feature ft is not extracted as a result of step #04 (step #05: No), the process returns to step #01. When the target feature ft is extracted (step #05: Yes), the feature extraction portion 5 acquires the feature information F of the target feature ft (step #06) extracted in step #04 from the map database 6 using the feature information acquisition unit 58.

Next, the image recognition portion 12 performs the image recognition process (step #07) of the target feature ft with respect to the image information acquired in step #01 using feature information F of one or more target features ft (see FIG. 14) acquired in step #06. When the image recognition of the target feature ft has failed as a result of step #07 (step #08: No), the process is terminated. On the other hand, when the image recognition of the target feature ft has succeeded as a result of step #07 (step #08: Yes), the current position correction portion 14 performs the process of correcting the current position information (step #09) based on the result of the image recognition process of step #07 and the feature information F of the target feature ft acquired in step #06. Accordingly, as described above, the current position correction portion 14 calculates and acquires the highly-accurate position information of the vehicle with the position information of the target feature ft (feature information F) as the reference based on the calculation result of the positional relation of the vehicle and the target feature ft, which is based on the image recognition process of step #07, and the position information of the target feature ft, which is included in the feature information F acquired in step #06, and corrects the current position information based thereon. As a result, the current position information acquisition portion 13 can acquire the highly-accurate current position information after correction.

1-11. Overview of Feature Extraction Method

Figure 5:
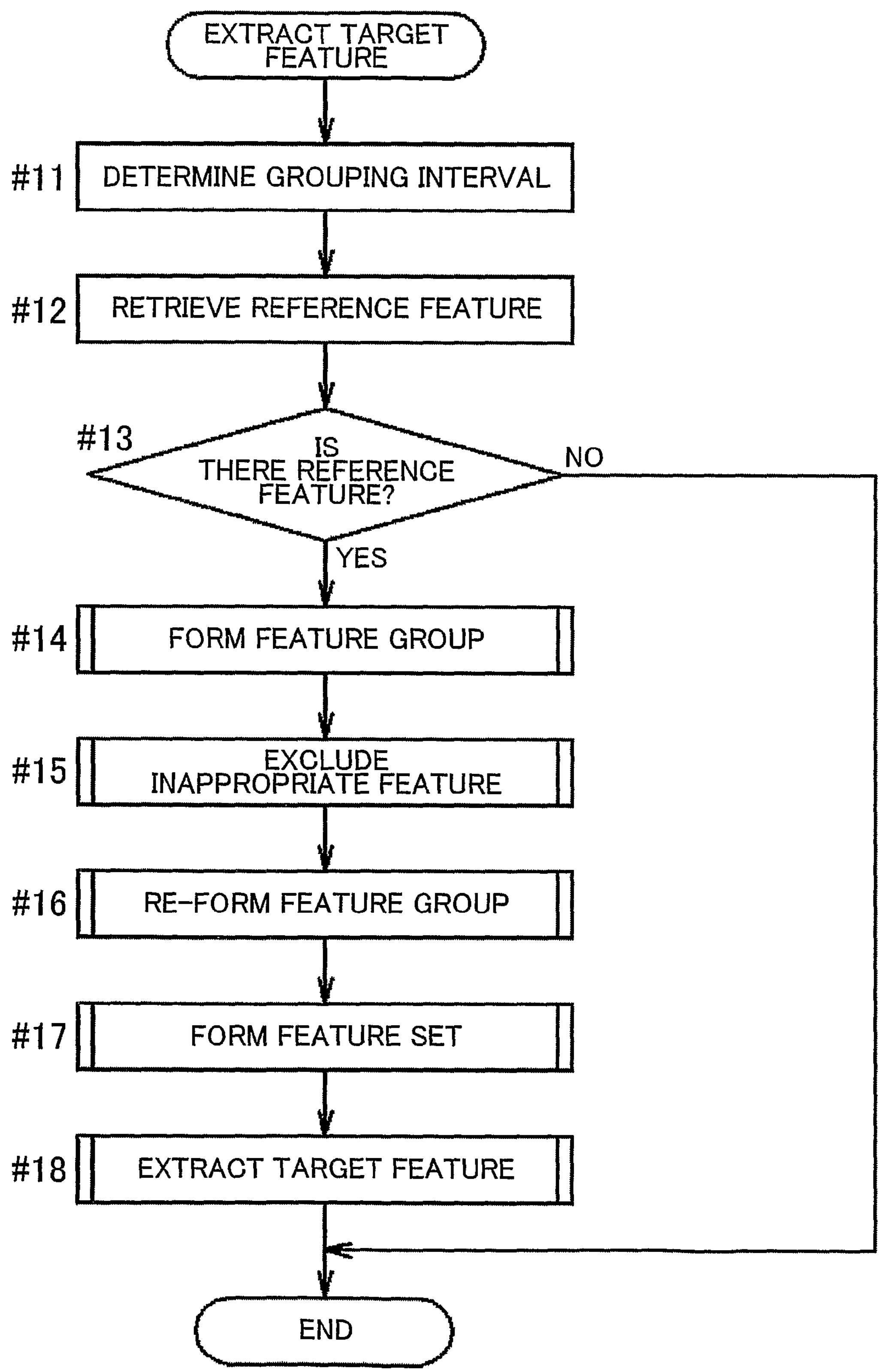
FIG. 5 is a flowchart showing an overview of a processing order of a feature extraction method.

Next, details of the feature extraction method according to a target feature extraction step (step #04) of FIG. 4 will be described. FIG. 5 is a flowchart showing an overview of a processing order of the feature extraction method according to this embodiment. FIGS. 6 to 10 are flowcharts respectively showing details of a processing order of a feature group formation step (step #14), an exclusion step (step #15), a feature group re-formation step (step #16), a feature set formation step (step #17), and an extraction step (step #18) in the feature extraction method shown in FIG. 5. FIGS. 11 to 14 are illustrative views for sequentially illustrating each process of the feature extraction method using a specific example of the plurality of the features, of which the feature information F is stored in the map database 6, arranged along the road. The feature extraction method according to this embodiment will be described below in detail using the drawings.

Note that, in this example, an example is described of a case where the target feature ft is extracted for a purpose of recognizing the feature, present on a near (rear) side with respect to the stop line as a reference feature fb, as an image and correcting the current position information, in order to precisely perform a brake assist control of the vehicle at the stop line. In the description of this example, "fore" and "rear" refer to directions along the road regarding an arrangement of the feature, and "fore" represents a direction (far side in the travel direction) identical with the travel direction of the vehicle and "rear" represents an opposite direction (near side in the travel direction) with respect to the travel direction of the vehicle. In the description of this example, a plurality of features f1 to f18 are generically referred to simply as "feature f," the plurality of the feature groups G1 to G5 and the like are generically referred to simply as "feature group G," and the plurality of the feature sets S1 to S7 are generically referred to simply as "feature set S." In this embodiment, a condition within a grouping interval X in the case of retrieving another feature f within the grouping interval X is applied to all other features f of which at least a part is within the grouping interval X.

In the feature extraction portion 5, the grouping interval determination unit 51 first determines the grouping interval X (see FIGS. 11 and 13) (step #11) depending on the estimation error E calculated in step #3 (see FIG. 4) described above. In this embodiment, the grouping interval X is a value twice the estimation error E (X=2E) as an example. The estimation error E is the estimation value of the maximum error of the current position information acquired by the current position information acquisition portion 13, and corresponds to a radius of the maximum error with a position shown by the current position information as a center. The value twice the estimation error E corresponds to a diameter of the maximum error with the position shown by the current position information as the center, and corresponds to a maximum error range of an actual position of the vehicle with respect to the current position information when seen in the travel direction of the vehicle. In this manner, by setting different values for the grouping interval X depending on the estimation error E, the plurality of the features f adjacent with a relatively narrow interval can be the target feature ft (see FIG. 14) when the estimation error E is large, whereby the plurality of the target features ft can be recognition targets of one image recognition process. Thus, in the image recognition process of the target feature ft, a false recognition of one of the plurality of the features f as another adjacent feature f can be reduced. On the other hand, when the estimation error E is small, each of the plurality of the features f can be the target feature ft of separate image recognition processes, whereby an opportunity of the image recognition process can be increased even with the same number of the features f which are possible target features ft present in the travel direction from the current position. Therefore, even when the image recognition of one target feature ft has failed, a possibility of succeeding in the image recognition of another target feature ft to obtain the image recognition result can be increased.

Next, the reference feature retrieval unit 52 retrieves a reference feature fb (step #12) from the plurality of the features f of which the feature information F is stored in the map database 6. The reference feature retrieval unit 52 performs retrieval of the reference feature fb within a range of a predetermined distance (for example, 300 m) in the travel direction of the vehicle. In this example, the reference feature retrieval unit 52 retrieves the stop line, of which the feature type is the stop line and which is further present on the near (rear) side of a connection portion of a narrow street with an arterial highway, as the reference feature fb (see FIGS. 11 to 14). In the example shown in the illustrative views of FIGS. 11 to 14, the feature f1 which is the stop line in a foremost position (upper left area in the drawing) of the road shown in the drawing is retrieved as the reference feature fb. Note that the stop line as the feature f1 is the feature f as a control target when the brake assist control of the vehicle is performed. When the reference feature fb is not present within the range of the predetermined distance in the travel direction of the vehicle (step #13: No), the process is terminated without performing the extraction of the target feature ft. On the other hand, when the reference feature fb is present (step #13: Yes), the feature group formation step (step #14) by the feature group formation unit 53, the exclusion step (step #15) of excluding an inappropriate feature by the exclusion unit 54, the feature group re-formation step (step #16) by the feature group re-formation unit 55, the feature set formation step (step #17) by the feature set formation unit 56, and the extraction step (step #18) of the target feature ft by the extraction unit 57 are sequentially executed. Each of the steps #14 to #18 will be described below in detail.

1-12. Details of Feature Group Formation Step

Figure 6:
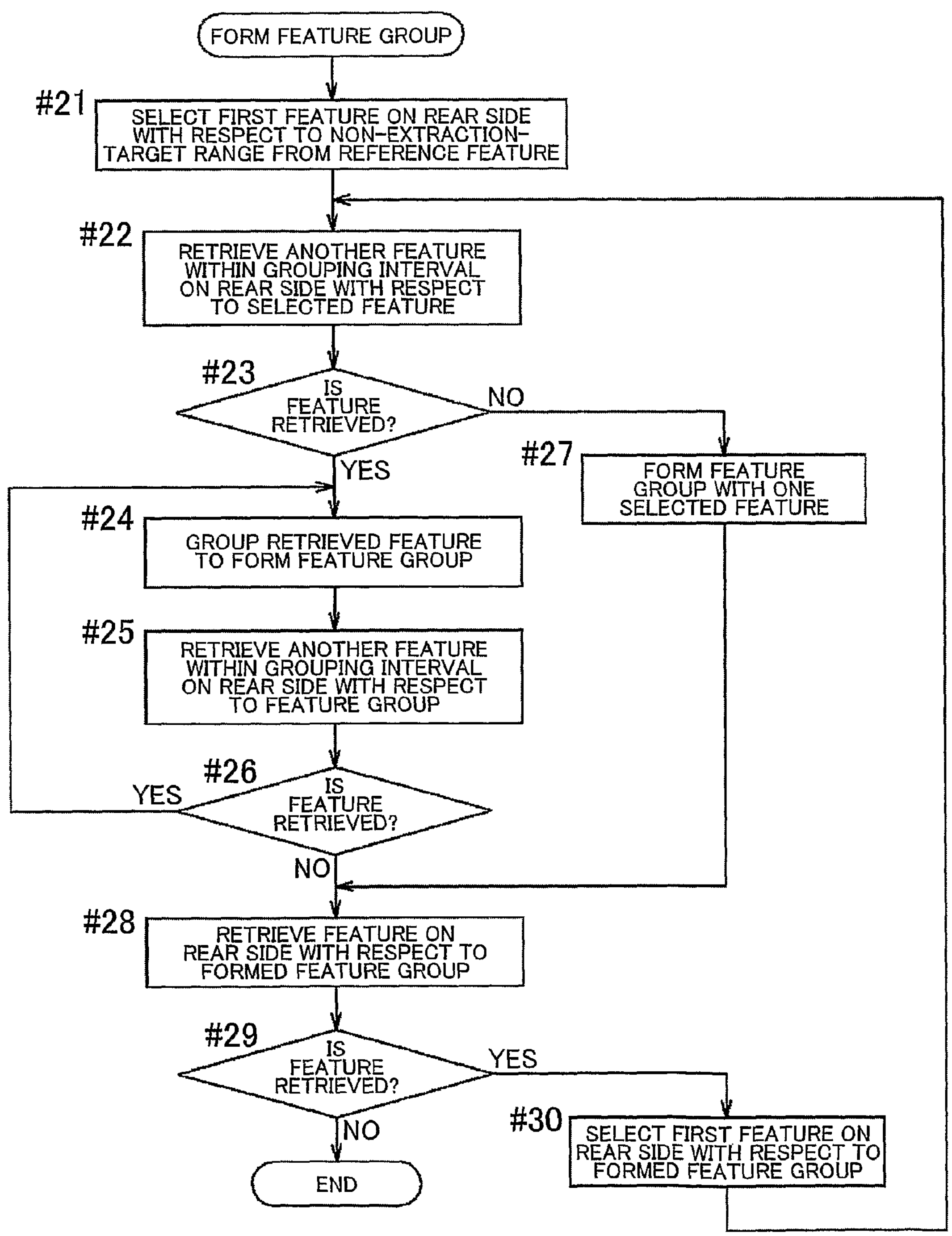
FIG. 6 is a flowchart showing a processing order of a feature group formation step in detail.
Figure 11:
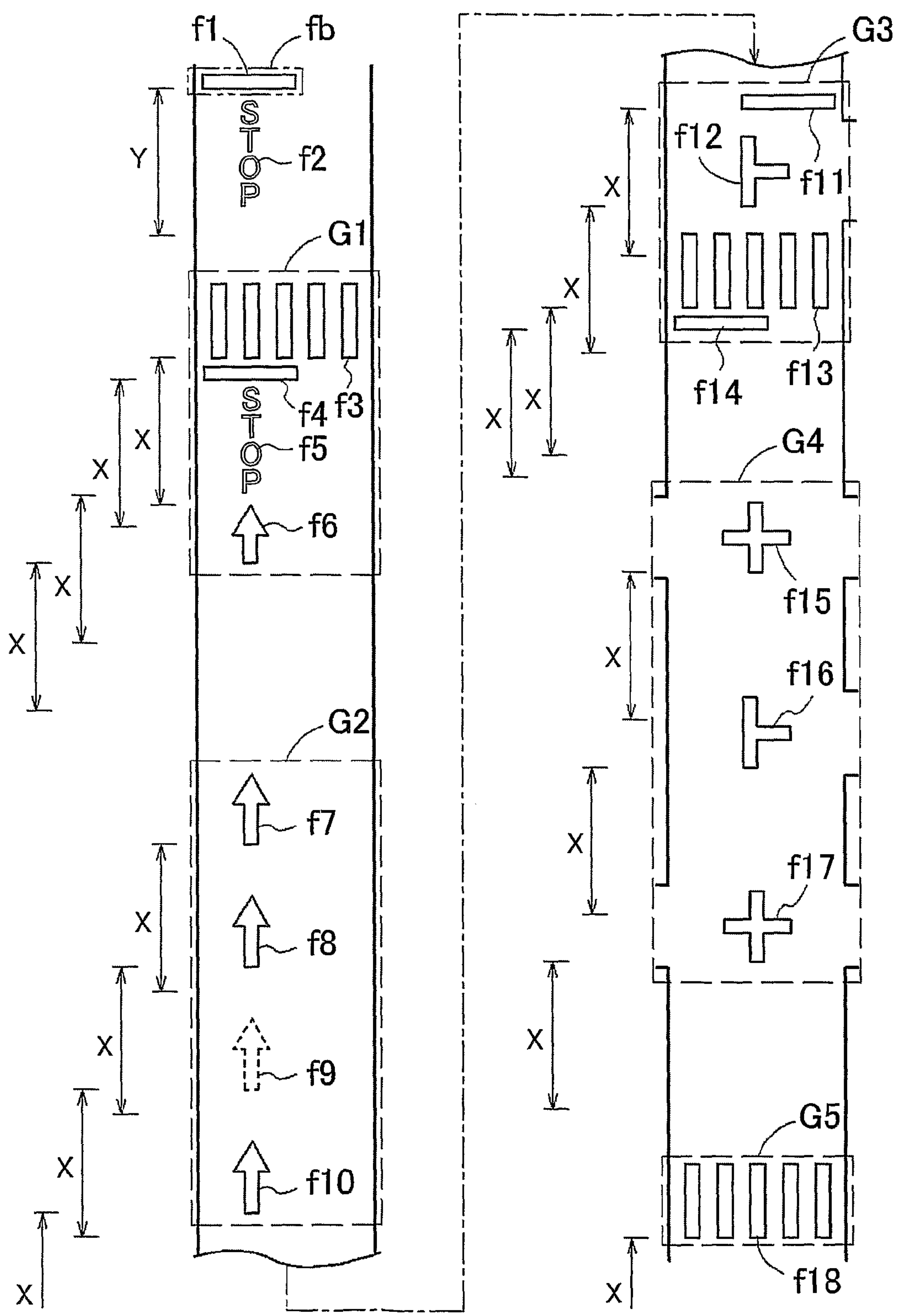
FIG. 11 is an illustrative view for specifically illustrating a process of the feature group formation step.

The details of the processing order of the feature group formation step (step #14) is first described based on the flowchart of FIG. 6 and the illustrative view of FIG. 11. In the feature group formation step (step #14), the feature group formation unit 53 performs a process of grouping a cluster of features f, in which an interval of the respective features f is less than or equal to the grouping interval X, to form the feature group based on the feature information F of the plurality of the features f stored in the map database 6. To this end, as shown in FIG. 6, the feature group formation unit 53 first selects a first feature f on a rear side with respect to a non-extraction-target range Y from the reference features fb (step #21) retrieved in step #12. The non-extraction-target range Y is a range in which performing a brake assist of the vehicle with respect to the stop line as the feature f1 (see FIG. 11) as the reference feature fb is not appropriate, and is a range of up to 50 m rearward from the reference feature fb along the road, for example.

Next, the feature group formation unit 53 retrieves another feature f within the grouping interval X on the rear side of the feature f selected in step #21 (step #22). As the grouping interval X, the grouping interval X determined in step #11 is used. When another such feature f is retrieved (step #23: Yes), the retrieved feature f is combined with the feature selected in step #21 to be grouped, whereby the feature group G is formed (step #24). Next, the feature group formation unit 53 further retrieves another feature f within the grouping interval X on the rear side of the feature group G (step #25) formed in step #24. When another such feature f is retrieved (step #26: Yes), the feature group formation unit 53 further combines and groups the retrieved feature f with the feature group G formed in step #24, whereby the feature group G is formed (step #24). The feature group formation unit 53 repeats the processes of steps #24 to #26 until another feature f is not retrieved within the grouping interval X on the rear side of the feature group G. When another feature f is not retrieved within the grouping interval X on the rear side of the feature group G (step #26: No), formation of one feature group G is terminated and the process proceeds to step #28. Also, when another feature f is not retrieved within the grouping interval X on the rear side of the selected feature f in step #23 (step #23: No), the feature group G is formed by only one selected feature f (step #27) and the process proceeds to step #28. Accordingly, the feature group G can be individually formed with each feature f which has not been grouped.

After one feature group G is formed in this manner, the feature group formation unit 53 further retrieves the feature f on the rear side of the formed feature group G (step #28). When the feature f on the rear side of the formed feature group G is retrieved (step #29: Yes), the first feature f on the rear side of the formed feature group G is selected (step #30) and the process returns to step #22. Accordingly, the formation of the feature group G with the feature f selected in step #30 as the first feature f is further performed. On the other hand, when another feature f on the rear side of the formed feature group G is not retrieved (step #29: No), the process of the feature group formation step (step #14) is terminated. Such cases where another feature f is not retrieved on the rear side of the formed feature group G include a case where the vehicle is present between the feature group G and another feature f on the rear side of the feature group and a case where the feature information F of the feature f on the rear side of the feature group G is not stored in the map database 6.

In an example shown in FIG. 11, since characters "STOP" as the feature f2 are present within the non-extraction-target range Y from the stop line as the feature f1 which is the reference feature fb, the crosswalk as the feature 13 is first selected as the first feature f on the rear side of the non-extraction-target range Y (step #21). Next, the stop line as the feature f4 and the characters "STOP" as the feature f5 are retrieved as the features f present within the grouping interval X on the rear side of the feature 13 first selected (step #22, step #23: Yes) and are grouped (step #24). The straight arrow as the feature f6 is retrieved as the feature f present within the grouping interval X on the rear side of the feature f5 (step #25, step #26: Yes) which is the rearmost feature of those grouped, and is grouped (step #24). Then, since the feature f is not present within the grouping interval X on the rear side of the feature f6 which is the rearmost feature of those grouped (step #26: No), one feature group G1 is formed by the features f3 to f6.

Then, when the feature f is retrieved on the rear side of the formed feature group G1 (step #28) beyond the grouping interval X, the straight arrow as the feature f7 is first retrieved (step #29: Yes). The retrieved feature f7 is selected as the first feature f on the rear side of the feature group G1 (step #30), and the cluster of the features f7 to f10 in which the interval of the respective features f is less than or equal to the grouping interval X is grouped to form the feature group G2. In a similar manner, the feature group G3 is formed by the features f11 to f14, and the feature group G4 is formed by the features f15 to f17. The crosswalk as the feature f18 arranged on the rear side of the feature group G4 beyond the grouping interval X is selected as the first feature on the rear side of the feature group G4 (step #30). However, since another feature f is not present within the grouping interval X on the rear side of the feature f18 (step #23: No), the feature group G5 is formed by only one selected feature f18 (step #27). In this example, since the feature f is not retrieved on the rear side of the feature group G5 (step #29: No), the process of the feature group formation step (step #14) is thus terminated.

1-13. Details of Exclusion Step

Next, the details of processing order of the exclusion step (step #15) will be described based on the flowcharts of FIGS. 5 and 7 and the illustrative view of FIG. 12. In the exclusion step (step #15), the exclusion unit 54 performs a process of excluding the feature f (inappropriate feature) inappropriate for use in the image recognition process of the feature f with respect to the image information from the cluster of the features within the feature groups G (G1 to G5) formed in the feature group formation step (step #14). In this embodiment, when the plurality of the features f, i.e., the feature belonging to the feature type defined as a non-target of extraction in advance and the feature f of a different feature type, which have the possibility of being falsely recognized with each other are present, the feature f of at least one of the feature types is excluded as the feature f inappropriate for use in the image recognition process in the exclusion step (step #15).

Figure 7:
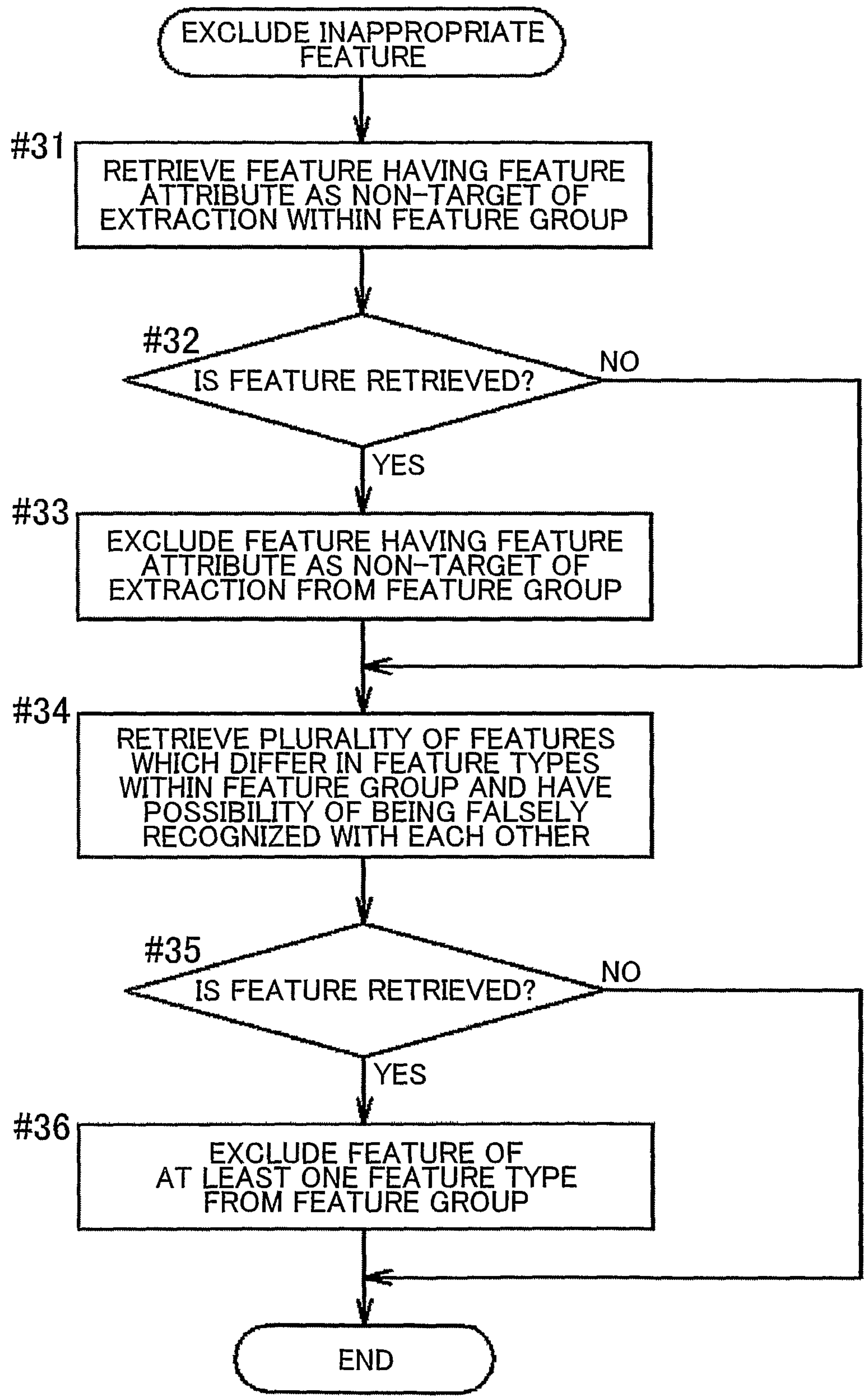
FIG. 7 is a flowchart showing a processing order of an exclusion step in detail.

To this end, as shown in FIG. 7, the exclusion unit 54 retrieves the feature f having a feature attribute as the non-target of extraction within the feature group G (step #31) based on information of the feature attribute included in the feature information F of each feature f in the feature group a When such feature f is retrieved (step #32: Yes), the retrieved feature f is excluded from the feature group G (step #33). Examples of the feature attribute as the non-target of extraction include the feature attribute inappropriate for the image recognition process such as the feature type which is not suitable for use in the image recognition process due to a complicated shape as in the characters of "STOP" and the like and a state of the feature which is not suitable for use in the image recognition process due to considerable wear. In this embodiment, whether the feature type is the non-target of extraction not suitable for use in the image recognition process is determined based on the target feature type table 8. That is, as described above, the target feature type table 8 stores the information of the feature type, which is to become the extraction target as the target feature ft, suitable for use in the image recognition process. Thus, the exclusion unit 54 determines that the feature f of the feature type not stored in the target feature type table 8 is the feature type (feature attribute) as the non-target of extraction. Note that, in this embodiment, steps #31 to #33 correspond to a non-target feature exclusion step of the present invention.

Next, the exclusion unit 54 retrieves the plurality of the features f which differ in the feature type within the feature group G and which have the possibility of being falsely recognized with each other (step #34). When such feature f is retrieved (step #35: Yes), the feature f of at least one of the feature types of the retrieved feature f is excluded from the feature group G (step #36). In step #36, the process of excluding the feature f of the feature type with at least a lower recognition rate in the image recognition process of the features f of the plurality of the feature types from the feature group G is performed. In this embodiment, the false recognition table 9 is used for the processes of steps #34 to #36. That is, as described above, the false recognition table 9 stores the information of the combination of the feature types, which have the possibility of being falsely recognized with each other, of the plurality of the feature types as the extraction target and the information defining which feature type of the feature f is to be excluded in the combination of the feature types which have the possibility of being falsely recognized with each other. Thus, the exclusion unit 54 determines the combination of the features f of the feature types, of which the information is stored in the false recognition table 9, as the plurality of the features f which have the possibility of being falsely recognized with each other. The exclusion unit 54 determines which feature type of the feature f to exclude in the determined combination of the features f of the feature types, which have the possibility of being falsely recognized with each other, based on the information stored in the false recognition table 9. Regarding which feature type of the feature to exclude, it is defined that the feature f of the feature type with the lower recognition rate, based on the recognition rate in the image recognition process, is excluded, as described above. Note that, for the feature types with the same degree of the recognition rate, there may be cases where it is defined that the features f of both feature types are excluded. Note that, in this embodiment, steps #34 to #36 correspond to a false recognition feature exclusion step of the present invention.

Figure 12:
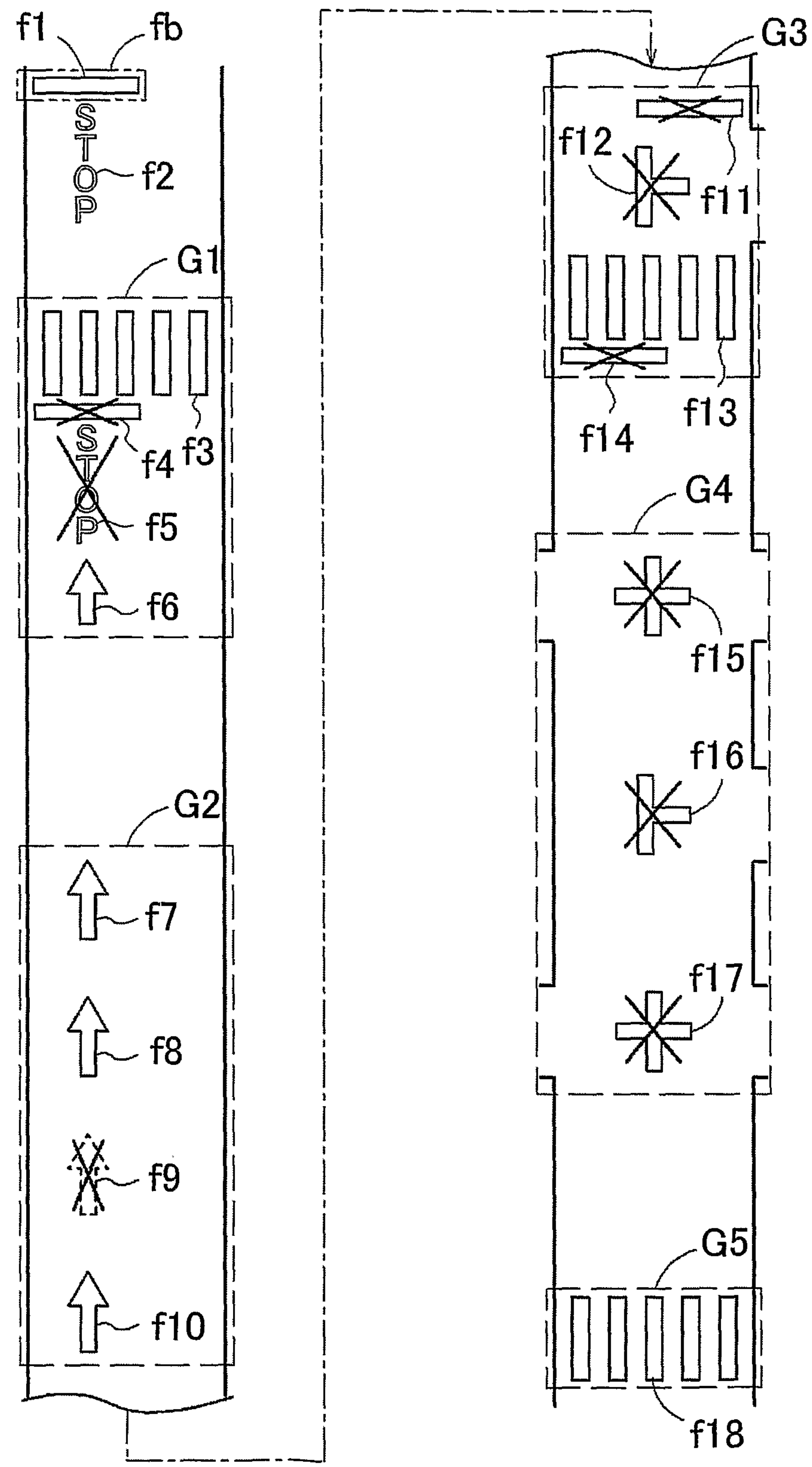
FIG. 12 is an illustrative view for specifically illustrating a process of the exclusion step.

In an example shown in FIG. 12, the characters "STOP" as the feature f5 are retrieved as the feature f having the feature attribute as the non-target of extraction within the feature group G1 (step #31, step #32: Yes), and is excluded from the feature group G1 (step #33). The feature f5 corresponds to the feature f of the feature type not suitable for use in the image recognition process based on the target feature type table 8. Next, based on the false recognition table 9, the combination of the crosswalk as the feature f3 and the stop line as the feature f4 is retrieved as the plurality of the features f which differ in the feature type within the feature group G1 and which have the possibility of being falsely recognized with each other (step #34, step #35: Yes). The stop line as the feature f4 with the lower recognition rate in the image recognition process is excluded from the feature group G1 (step #36) based on the false recognition table 9.

Next, the straight arrow as the feature f9 is retrieved as the feature f having the feature attribute as the non-target of extraction within the feature group G2 (step #31, step #32: Yes), and is excluded from the feature group G2 (step #33). The feature f9 corresponds to the feature f in the state where the information of the state of the feature included in the feature information F is not suitable for use in the image recognition process due to considerable wear. Note that, since the four features f7 to f10 within the feature group G2 are all of the same feature type, the plurality of the features f, which differ in the feature type within the feature group G2 and may be falsely recognized with each other, are not retrieved (step #34, step #35: No). In a similar manner, the features f11, f12 and f14 are excluded in the feature group G3, and all of the features f15 to f17 within the feature group G4 are excluded in the feature group G4. Note that the features f within the feature group G4 are the cross marks as the feature f15 and f17 and the T mark as the feature f16, and since it is defined in the false recognition table 9 that both are to be excluded regarding these feature types, all of the features 115 to f17 are excluded in the feature group G4. Since only the crosswalk as the feature f18 is present within the feature group G5 and the feature f18 does not correspond to the feature having the feature attribute as the non-target of extraction (step #32: No), no feature f is excluded in the feature group G5. The exclusion step (step #15) is thus terminated.

1-14. Details of Feature Group Re-Formation Step

Next, the details of the processing order of the feature group re-formation step (step #16) will be described based on the flowcharts of FIGS. 5 and 8 and the illustrative view of FIG. 13. In the feature group re-formation step (step #16), the feature group re-formation unit 55 performs the process of grouping the cluster of features f, in which the interval of the respective features f is less than or equal to the grouping interval X, of one or more features f within the feature group G remaining as a result of the exclusion step (step #15) to newly form the feature group G. In this embodiment, the process of forming the new feature group G by the feature group re-formation step (step #16) is performed within one old feature group G among the feature groups G (01 to G5) formed in the feature group formation step (step #14). When a distinction is necessary among the feature groups G, the feature group G newly formed by the feature group re-formation step (step #16) is hereinafter called a "new feature group G," and the feature group G formed in the feature group formation step (step #14) is called an "old feature group G"

Figure 8:
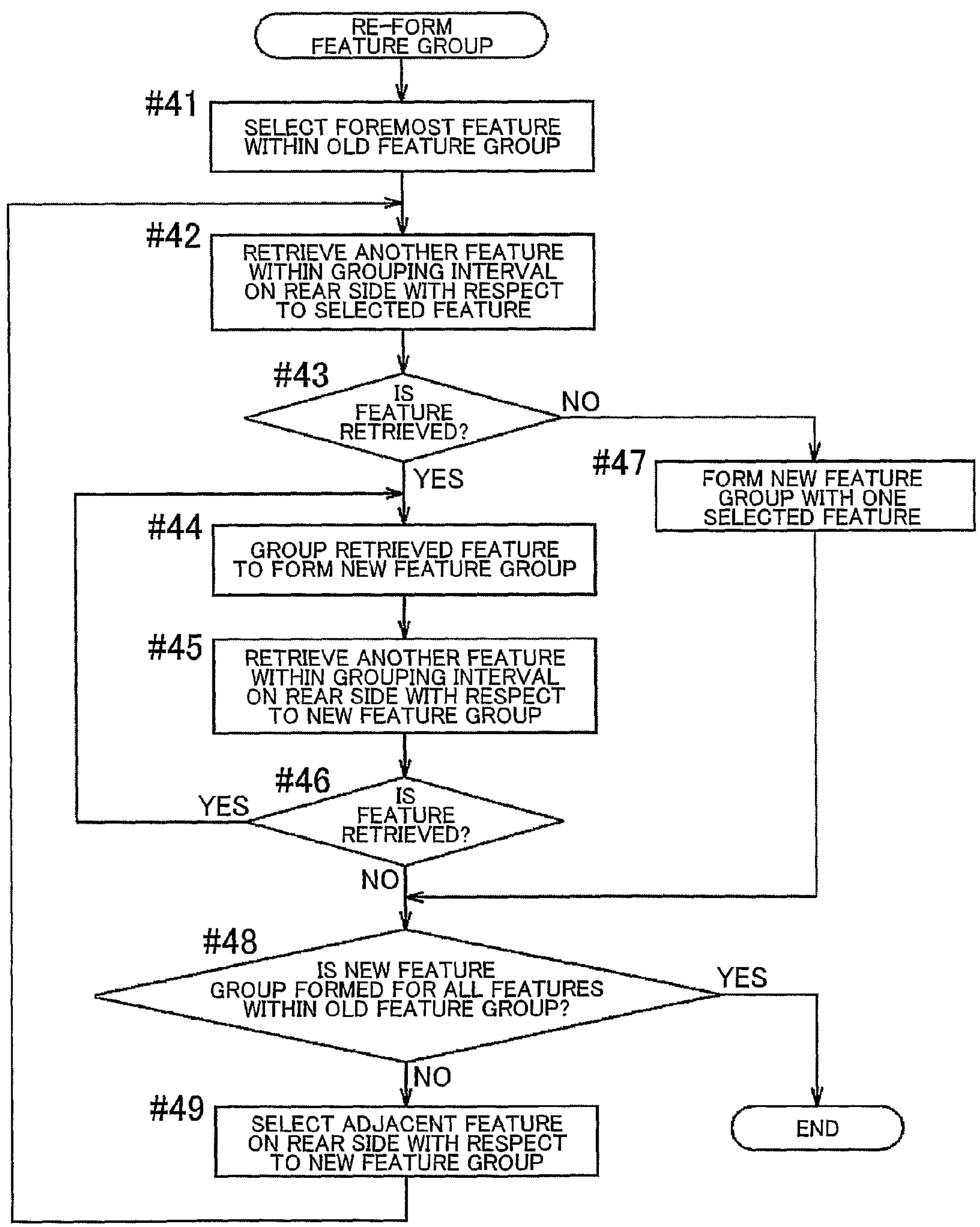
FIG. 8 is a flowchart showing a processing order of a feature group re-formation step in detail.

As shown in FIG. 8, the feature group re-formation unit 55 selects the foremost feature f excluding the feature f excluded in the exclusion step (step #15) within the old feature group G (step #41), for one of the old feature groups G (G1 to G5) formed in the feature group formation step (step #14). Next, the feature group re-formation unit 55 retrieves another feature f within the grouping interval X on the rear side of the feature f selected in step #41 (step #42). As the grouping interval X, the grouping interval X determined in step #11 is used in a similar manner to that of the feature group formation step (step #14). When another such feature f is retrieved (step #43: Yes), the retrieved feature f is combined with the feature selected in step #41 to be grouped, whereby the new feature group G is formed (step #44).

Next, the feature group re-formation unit 55 further retrieves another feature f within the grouping interval X on the rear side of the new feature group G formed in step #44 (step #45). When another such feature f is retrieved (step #46: Yes), the feature group re-formation unit 55 further combines and groups the retrieved feature f with the new feature group G formed in step #44, whereby the new feature group G is formed (step #44). The feature group re-formation unit 55 repeats the processes of steps #44 to #46 until another feature f is not retrieved within the grouping interval X on the rear side of the new feature group C1 When another feature f is not retrieved (step #46: No) within the grouping interval X on the rear side of the new feature group formation of one new feature group G is terminated and the process proceeds to step #48. Also, when another feature f is not retrieved (step #43: No) within the grouping interval X on the rear side of the selected feature f in step #43, the new feature group G is formed by only one selected feature f (step #47), and the process proceeds to step #48. Accordingly, the new feature group G can be formed individually for each feature f which has not been grouped.

After one new feature group G is formed in this manner, the feature group re-formation unit 55 determines whether the new feature group G is formed for all of the features f excluding the feature f excluded in the exclusion step (step #15) within the old feature group G which is presently a process target. When the new feature group G is not formed for all of the features f within the old feature group G (step #48: No), the feature group re-formation unit 55 selects the first feature f on the rear side of the new feature group G already formed (step #49) and the process returns to step #42. Accordingly, the formation of the new feature group G with the feature f selected in step #49 as the first feature f is further performed. On the other hand, when the new feature group G is formed for all of the features f within the old feature group G (step #48: Yes), the process of the feature group re-formation step (step #16) is terminated. In the subsequent feature set formation step (step #17) and the extraction step (step #18), the new feature group G is treated as the feature group G when the new feature group G is formed within the old feature group G. Note that the old feature group G in which the new feature group G is not formed is treated as the feature group as in the case where all of the features f within the old feature group G are excluded.

Figure 13:
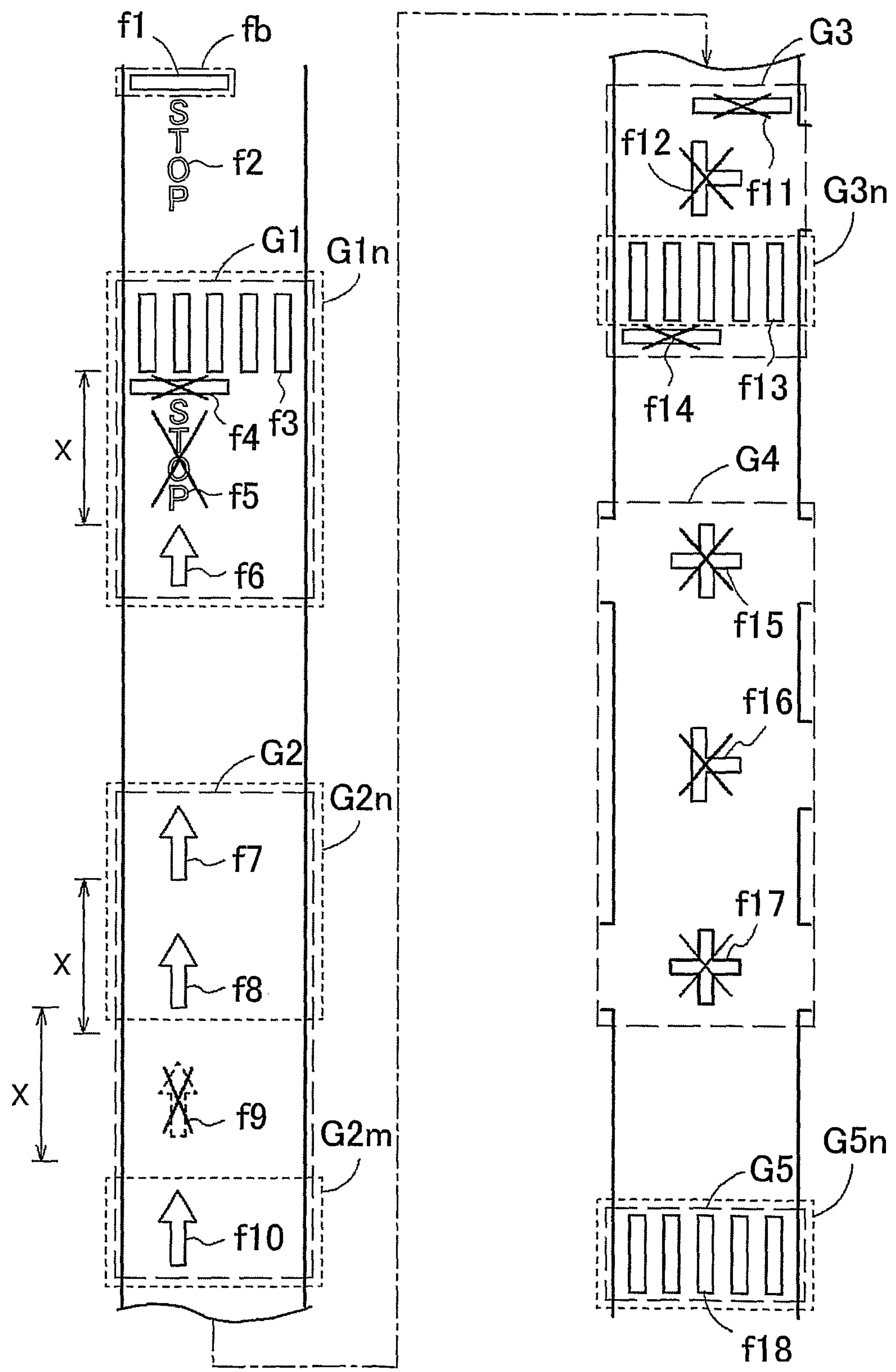
FIG. 13 is an illustrative view for specifically illustrating a process of the feature group re-formation step.

In an example shown in FIG. 13, the crosswalk as the feature f3 of the old feature group G1 is first selected as the foremost feature f (step #41) excluding the feature f excluded in the exclusion step (step #15) in the old feature group G1. Next, the straight arrow as the feature f6 is retrieved as the feature f present within the grouping interval X on the rear side of the selected feature f3 (step #42, step #43: Yes), and is grouped (step #44). The new feature group is thus formed for all of the features f within the old feature group 01 (step #48: Yes) excluding the feature f excluded in the exclusion step (step #15), whereby one new feature group G**1*n* is formed by the features f3 and f6 and the process of the feature group re-formation step (step #16) for the old feature group G1** is terminated.

For the old feature group G2, the straight arrow as the feature f7 is first selected as the foremost feature f (step #41) excluding the feature f excluded in the exclusion step (step #15) within the old feature group G2. Next, the straight arrow as the feature f8 is similarly retrieved as the feature f present within the grouping interval X on the rear side of the selected feature f7 (steps #42 and #43: Yes), and is grouped (step #44). Then, since the feature f is not present within the grouping interval X on the rear side of the feature f8 (step #45, step #46: No) which is the rearmost feature of those grouped, one new feature group G**2*n* is formed by the features f7 and f8. Then, since the new feature group is not formed for all of the features f within the old feature group G2, the straight arrow as the feature f10** is selected as the feature f adjacent to and on the rear side of the new feature group G2*n* (step #49) excluding the feature f excluded in the exclusion step (step #15). Since another feature f is not present on the rear side of the feature f10 in the old feature group G2 (step #42, step #43: No), a new feature group G2*m* is formed by only one selected feature f10 (step #47). The new feature group is thus formed for all of the features f within the old feature group G2 (step #48: Yes) excluding the feature f excluded in the exclusion step (step #15), whereby the process of the feature group re-formation step (step #16) for the old feature group G2 is terminated.

Since only one each of the features f13 and f18 is present in the old feature group G3 and the old feature group G5 excluding the feature f excluded in the exclusion step (step #15), a new feature group G3*n* is formed by only one feature f13 and a new feature group G5*n* is formed by only one feature f18. Note that, for the old feature group G4, since all of the features f within the old feature group G4 are excluded in the exclusion step (step #15), the new feature group is not formed, whereby the old feature group G4 is treated as the feature group G in the subsequent feature set formation step (step #17) and the extraction step (step #18).

1-15. Details of Feature Set Formation Step

Figure 9:
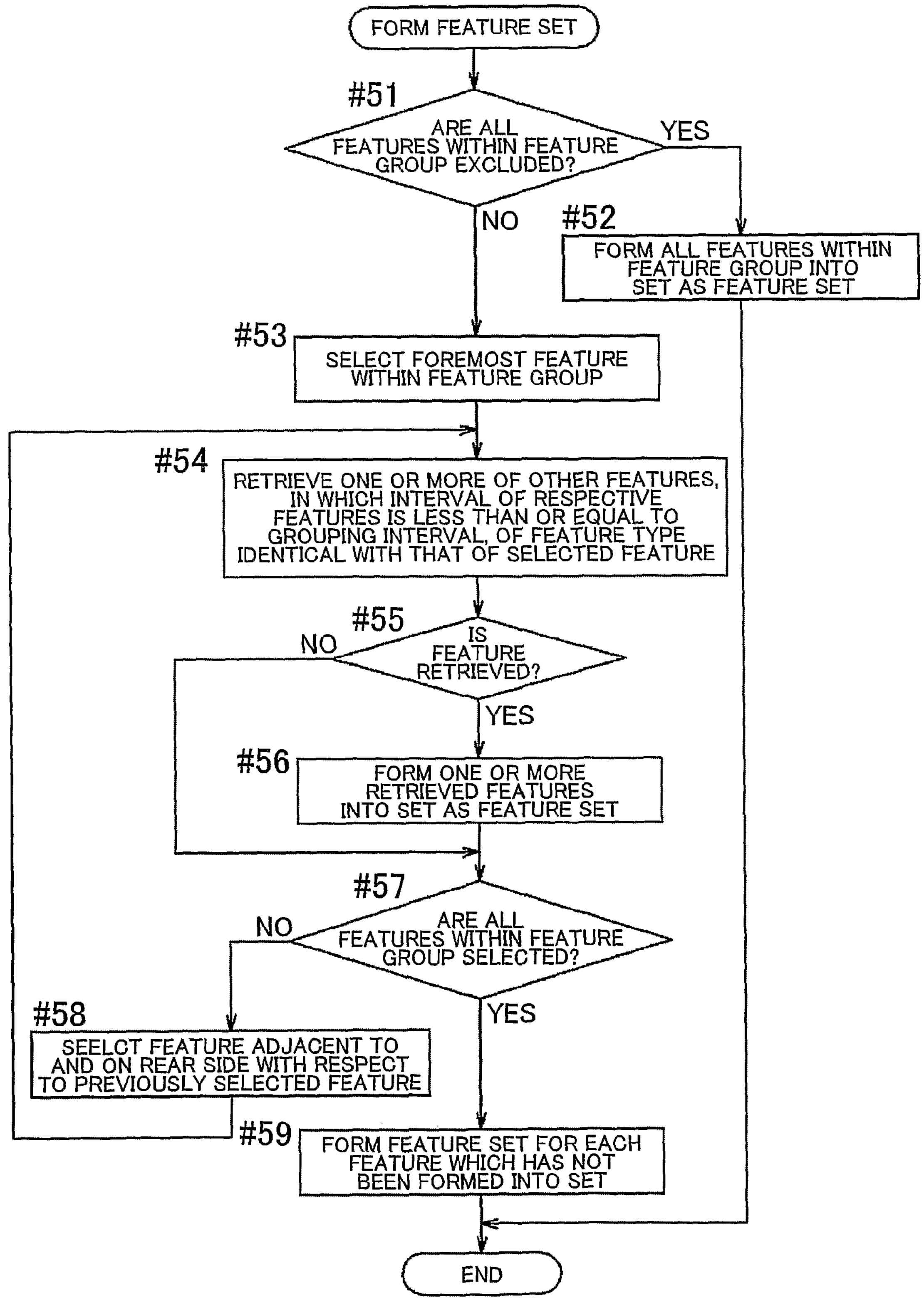
FIG. 9 is a flowchart showing a processing order of a feature set formation step in detail.

Next, the details of the processing order of the feature set formation step (step #17) will be described based on the flowcharts of FIGS. 5 and 9 and the illustrative view of FIG. 14. In the feature set formation step (step #17), the feature set formation unit 56 performs a process of forming the cluster of the features f, in which the interval of the respective features f is less than or equal to the grouping interval X, of the same feature type into a set as the feature set S, for one or more of the features f within the feature group G. As shown in FIG. 9, the feature set formation unit 56 determines whether all of the features f within the feature group G is excluded (step #51) by the exclusion step (step #15) for one of the feature groups G (G1*n*, G2*n*, G2*m*, G3*n*, G4, and G5*n*) formed at this point. When all of the features f within the feature group G is excluded (step #51: Yes), the feature set formation unit 56 forms all of the features f within the feature group G into the set as the feature set S (step #52).

On the other hand, when all of the features f within the feature group G are not excluded (step #51: No), the feature set formation unit 56 then selects the foremost feature f within the feature group G (step #53). Then, one or more of the other features f, in which the interval of the respective features f is less than or equal to the grouping interval X, of the same feature type as that of the feature f selected in step #53 are retrieved (step #54). As the grouping interval X, the grouping interval X determined in step #11 is used in a similar manner to that of the feature group formation step (step #14). Whether the feature types are the same is determined based on the feature information F of each feature f. When another such feature f is retrieved (step #55: Yes), the feature set formation unit 56 combines the retrieved one or more features f with the feature selected in step #53 to form the set as the feature set S (step #56).

On the other hand, when another feature f of the same feature type is not retrieved within the grouping interval X on the rear side of the feature f selected in step #53 (step #55: No), the feature set formation unit 56 does not perform the process of step #56. Then, the feature set formation unit 56 determines whether all of the features f within the feature group G are selected (step #57). When all of the features f within the feature group G is not selected (step #57: No), the feature f adjacent to and on the rear side of the feature f previously selected in step #53 is selected (step #58) excluding the feature f excluded in the exclusion step (step #15). The process returns to step #54, and one or more of the other features f, in which the interval of the respective features f is less than or equal to the grouping interval X, of the same feature type as that of the feature f selected in step #58 are retrieved (step #54). When the feature f is retrieved (step #55: Yes), the feature set S is formed (step #56) in a similar manner as described above. When all of the features f within the feature group G are selected (step #57: Yes), the feature set S is formed individually for each feature f for all of the features f which have not been formed into the set (step #59) excluding the feature f excluded in the exclusion step (step #15) within the feature group G which is presently the process target. The feature set formation step (step #17) is thus terminated.

For the feature group G1*n* in an example shown in FIG. 14, all of the features f within the feature group G1*n* have not been excluded (step #51: No) by the exclusion step (step #15). Therefore, the crosswalk as the feature f3 is then selected as the foremost feature f within the feature group G1*n* (step #53). However, since the crosswalk as the feature f of the same feature type as that of the feature f3 is not present within the feature group G1*n* (step #54, step #55: No), the straight arrow as the feature f6 adjacent to and on the rear side of the previously selected feature f is selected (step #58). However, the straight arrow as the feature f of the same feature type as that of the feature f6 is not present within the feature group G1*n*. Since all of the features f within the feature group G1*n* are thus selected (step #57: Yes), the feature sets S1 and S2 are respectively formed by each of the features f3 and f6 which have not been formed into the set (step #59), whereby the process of the feature set formation step (step #17) for the feature group G1*n* is terminated.

For the feature group G2*n*, not all of the features f within the feature group G2*n* have been excluded (step #51: No) by the exclusion step (step #15). Therefore, the straight arrow as the feature f7 is then selected as the foremost feature f within the feature group G2*n* (step #53). Then, the straight arrow as the feature 18 is retrieved as the feature f, in which the interval of the respective features f is less than or equal to the grouping interval X, of the same feature type as that of the selected feature f (step #54, step #55: Yes). Thus, the retrieved feature f8 is combined with the selected feature f7 to form the set as the feature set S3. The feature f8 adjacent to and on the rear side of the previously selected feature f7 is then selected, whereby the feature set S3 is merely formed by the combination with the feature f7 in the subsequent process. Thus, all of the features f within the feature group G1*n* are selected (step #57: Yes) and the feature f which has not been formed into the set is not present, whereby the process of the feature set formation step (step #17) for the feature group G2*n* is thus terminated.

For the feature group G4, all of the features f within the feature group G4 is excluded (step #51: Yes) by the exclusion step (step #15). Thus, all of the features f15 to f17 within the feature group G4 is formed into the set as the feature set S6 (step #52). The process of the feature set formation step (step #17) for the feature group G4 is thus terminated. Note that, since only one feature f is present within each feature group G for the feature groups G2*m*, G3*n*, and G5*n*, the feature sets S4, S5, and S7 are respectively formed individually by each feature f10, f13, and f18 (step #59).

1-16. Details of Extraction Step

Figure 10:
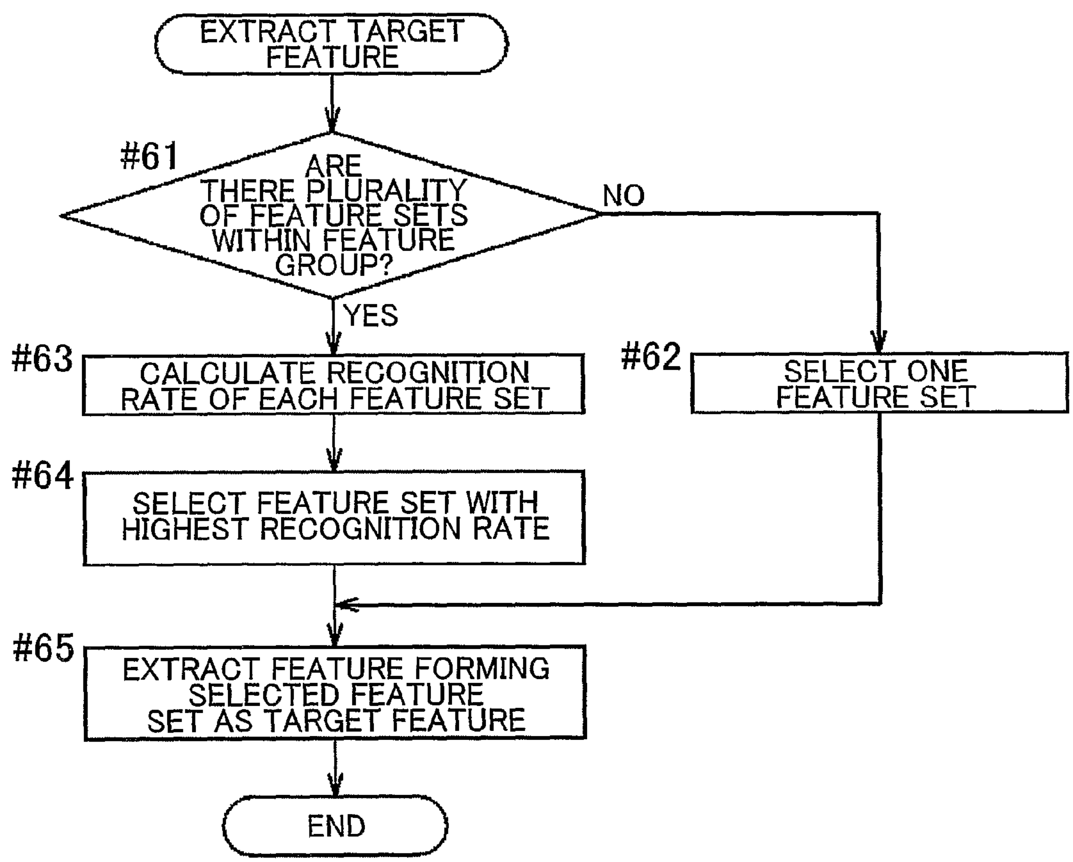
FIG. 10 is a flowchart showing a processing order of an extraction step in detail.

Next, the details of the processing order of the extraction step (step #18) is described based on the flowchart of FIG. 10 and the illustrative view of FIG. 14. In the extraction step (step #18), the extraction unit 57 performs a process of selecting one feature set S within the feature group G and extracting one or more features f forming the selected feature set S as the target feature ft suitable for use in the image recognition process by the image recognition portion 12. As shown in FIG. 10, the extraction unit 57 determines whether the plurality of the feature sets S are present within the feature group G (step #61) for one of the feature groups G (G1*n*, G2*n*, G2*m*, G3*n*, G4, and G5*n*) formed at this point. When the plurality of the feature sets S are not present within the feature group G (step #61: No), the extraction unit 57 selects one feature set S present within the feature group G (step #62) and the process proceeds to step #65.

On the other hand, when the plurality of the feature set S are present within the feature group G (step #61: Yes), the extraction unit 57 calculates the recognition rate in the image recognition process of each feature set S within the feature group G (step #63). The recognition rate of each feature set S is calculated by the recognition rate calculation portion 7. In this embodiment, the recognition rate calculation portion 7 calculates the recognition rate by using a recognition coefficient set in advance depending on the feature type to multiply the recognition coefficients depending on the feature type of each feature f forming the feature set S. Specifically, for example, when the feature set S is formed of n features f of which the recognition coefficients are C1, C2, . . . Cn (n is a natural number), a recognition rate R is obtained by the following formula (2).

$$R = C1 \times C2 \times \ldots \times Cn \quad (2)$$

Note that the recognition coefficients C1, C2, . . . Cn are all set as a value between 0 and 1. Thus, the recognition rate R of each feature set S becomes a smaller value as the number of the features included in the feature set S becomes larger. The extraction unit 57 selects the feature set S with the highest recognition rate in the plurality of the feature sets S within one feature group G (step #64), and the process proceeds to step #65. Then, the extraction unit 57 extracts one or more features f forming the feature set S selected in steps #62 or #64 as the target feature ft (step #65).

For the feature group G1*n* in the example shown in FIG. 14, two feature sets S1 and S2 are present within the feature group G1*n* (step #61: Yes). Thus, the recognition rates of the feature sets S1 and S2 are respectively calculated (step #63). For example, since the feature set S1 is formed of only the crosswalk as the feature f3, the recognition rate R of the feature set S1 is equal to the recognition coefficient (for example, 0.9) of the crosswalk. Since the feature set S2 is formed of only the straight arrow as the feature f6, the recognition rate R of the feature set S2 is equal to the recognition coefficient (for example, 0.8) of the straight arrow. In this example, since the recognition rate of the feature set S1 is high, the feature set S1 is selected (step #64), and the feature f3 forming the selected feature set S1 is extracted as the target feature ft (step #65).

In the other feature groups G2*n*, G2*m*, G3*n*, G4, and G5*n*, only one of the feature sets S3, S4, S5, S6, and S7 is present (step #61: No). Therefore, each of the feature sets S3, S4, S5, S6, and S7 is selected, and the features f forming each feature set S3, S4, 85, S6, and S7 are extracted as the target feature ft, respectively. Note that the feature set S6 is formed by excluding all of the features f within the feature group G4 by the exclusion step (step #15) and forming all of the features f15 to f17 into the set as the feature set S6. In the extraction step (step #18), the feature set S6 is selected (step #62), whereby all of the features f15 to f17 forming the feature set S6 are extracted as the target feature ft.

As described above, when the plurality of the features f forming one feature set S, such as the feature set S3 and the feature set S6, are extracted as the target feature ft, the image recognition portion 12 performs the image recognition process with the plurality of target features ft as the set (one set) in this embodiment. Accordingly, the cluster of features f, in which the interval of the respective features f is less than or equal to the grouping interval X, of the same feature type can be combined as the feature set S as the target feature ft. Thus, when the target feature ft is used in the image recognition process, it is possible to perform the image recognition process with the cluster of the features f as the set even if the cluster of the features f of the same feature type are arranged with the relatively narrow interval, whereby enabling to reduce the false recognition of one of the features f in the cluster with another adjacent feature f and to increase the recognition rate of the target feature ft.

2. Second Embodiment

Figure 15:
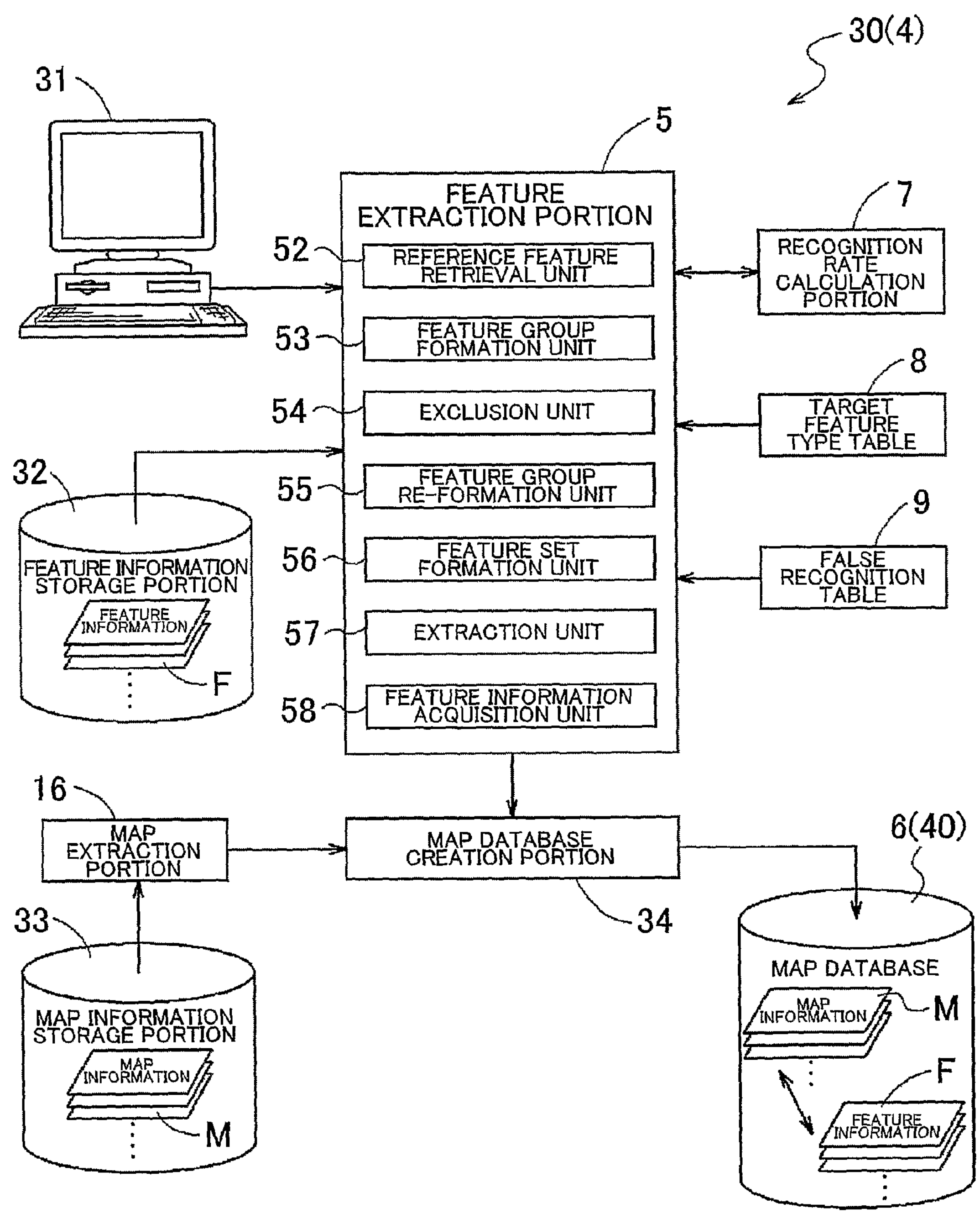
FIG. 15 is a block diagram showing a schematic configuration of a feature database creation device including a feature extraction device according to a second embodiment of the present invention.

Next, a second embodiment of the present invention will be described. FIG 15 is a block diagram showing a schematic configuration of a feature database creation device 30 including the feature extraction device 4 according to this embodiment. In this embodiment, the feature database creation device 30 creates the map database 6, which also serves as a feature database 40, based on the feature information F stored in a feature information storage portion 32 and the map information M stored in a map information storage portion 33. That is, the feature database creation device 30 extracts one or more target features ft suitable for use in the image recognition process of the feature with respect to the image information, based on the feature information F, from the plurality of the features of which the feature information F including at least the information of the position and the feature type is stored in the feature information storage portion 32. The feature database creation device 30 then acquires the feature information F of the extracted target feature ft from the feature information storage portion 32, associates the feature information F with the map information M acquired from the map information storage portion 33, and stores the feature information F in the map database 6.

Thus, the feature database creation device 30 can create the map database 6, which also serves as the feature database 40, storing the feature information F of the target feature ft extracted in advance to be suitably used for the image recognition process of the feature with respect to the image information. The created map database 6 can be suitably used for, for example, an image recognition device which performs the image recognition of the target feature ft, a current position recognition device which corrects the current position information based on the result of the image recognition process of the target feature ft by the image recognition device and the information of the position of the target feature ft included in the feature information F to acquire the highly-accurate current position information. That is, with the map database 6, in the image recognition device, the current position recognition device, or the like, the process of extracting one or more target features ft suitable for use in the image recognition process of the feature with respect to the image information from the plurality of the features of which the feature information F is stored in the map database 6 is unnecessary. Therefore, the image recognition device or the current position recognition device in which the process is simplified compared with the image recognition device 2 or the current position recognition device 3 according to the first embodiment described above can be realized.

The configurations of the feature extraction portion 5, the recognition rate calculation portion 7, the target feature type table 8, and the false recognition table 9 that form the feature extraction device 4 in the feature database creation device 30 are basically the same as those of the first embodiment described above. Note that, in this embodiment, the grouping interval X is a fixed value, and therefore, the feature extraction portion 5 differs from that of the first embodiment described above in that the grouping interval determination unit 51 is not provided. The feature database creation device 30 and a feature database creation method according to this embodiment will be described below in detail focusing on a difference from the first embodiment described above.

The feature information storage portion 32 is a storage unit storing the feature information F about a large number of the features which are actually present. The feature information F is created based on an actual situation shown in an aerial photograph, a drawing, a video image taken by a measurement vehicle or in a field investigation, and the like. The feature information storage portion 32 stores the feature information F created based on the actual situations regardless of suitability for the image recognition process of the feature with respect to the image information. The feature information F of each feature stored in the feature information storage portion 32 includes the information of the position and the information of the attribute of each feature as the content in a similar manner to that of the first embodiment described above. The information of the position includes the information of the position (latitude and longitude) of the representative point of each feature on the map and of the direction of each feature. The information of the attribute includes the information of the feature type, the figuration of the feature, and the state of the feature. The information of the feature type is information representing the feature type of each feature. The information of the figuration of the feature includes the information of the shape, size, color, and the like of each feature. The information of the state of the feature includes the information of the state of the feature which influences the image recognition process of each feature, such as the state of wear of each actual feature. In this embodiment, the feature information storage portion 32 corresponds to the feature information storage unit of the present invention.

The map information storage portion 33 is a storage unit storing the plurality of pieces of the map information M divided for each predetermined region. The content of the map information M is similar to the content of the information stored in the road network layer m1 and the road shape layer m2 stored in the map database 6 in the first embodiment described above.

An input device 31 includes a computer body, an operation portion such as a keyboard and a mouse, and a display portion such as a monitor. The input device 31 includes various software (program) forming a user interface so that a creation instruction can be input when creating data, in which the feature information F and the map information M are associated, to be stored in the map database 6. Examples of the creation instruction input from the input device 31 include an instruction of a creation area of the data to be stored in the map database 6 and an instruction of various settings for creation processing.

The map extraction portion 16 extracts and acquires the map information M, corresponding to an area instructed by the creation instruction input by the input device 31, from the map database 6 and outputs the map information M to the map database creation portion 34, in order for the map database creation portion 34 to create the data to be stored in the map database 6.

The map database creation portion 34 creates the data in which the feature information F of the target feature ft extracted and acquired by the feature extraction portion 5 and the map information M acquired by the map extraction portion 16 are associated, and stores the data in the map database 6. In this embodiment, the map database creation portion 34 functions as a storage processing unit which stores the feature information F acquired by the feature information acquisition unit 58 in a predetermined storage unit. In this embodiment, the map database 6 corresponds to the predetermined storage unit of the present invention that stores the feature information F.

Figure 16:
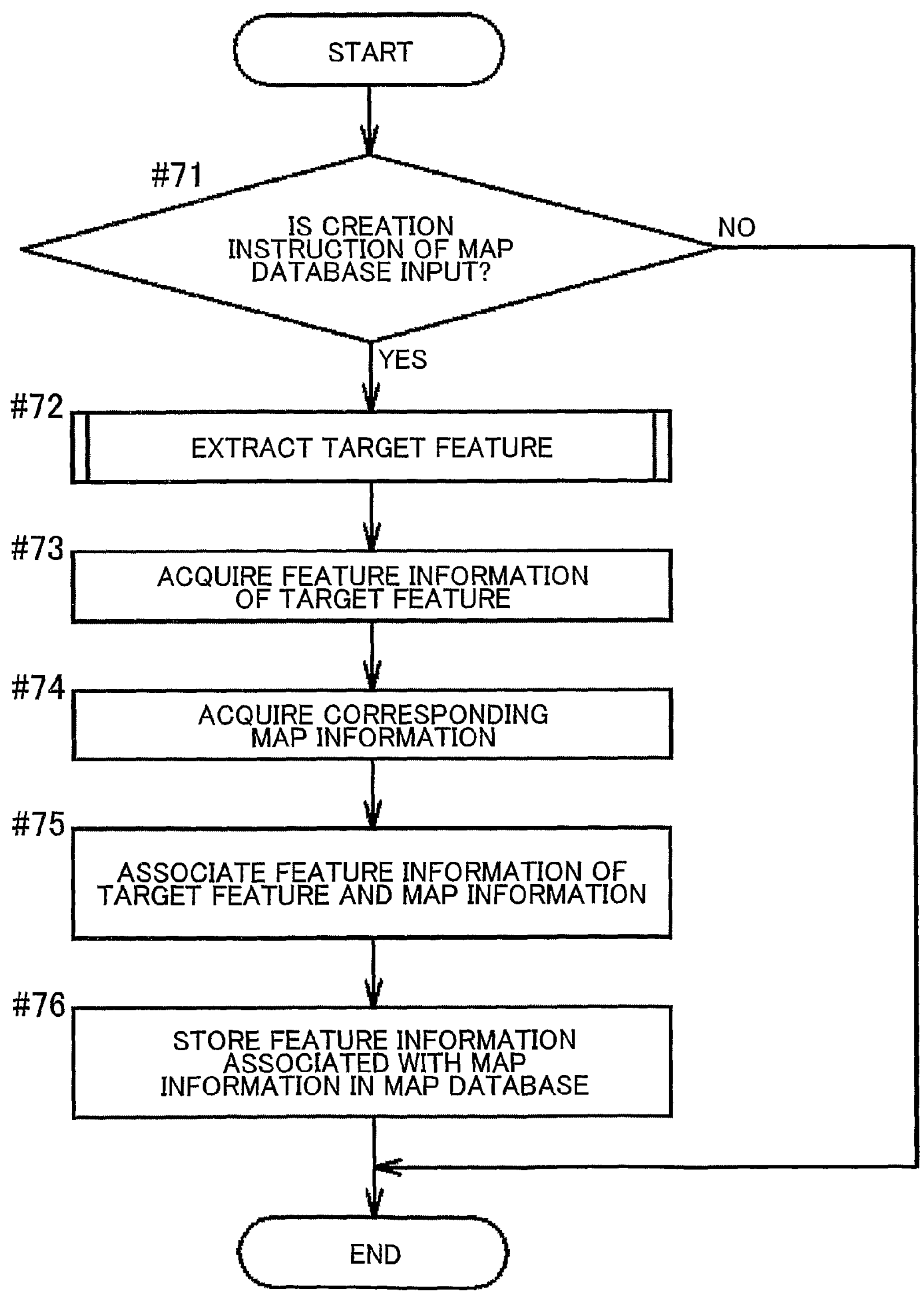
FIG. 16 is a flowchart showing a processing order of a feature database creation method according to the second embodiment of the present invention.

Next, the feature database creation method including the feature extraction method executed in the feature database creation device 30 according to this embodiment will be described. FIG. 16 is a flowchart showing the processing order of the feature database creation method according to this embodiment.

As shown in FIG. 16, when the creation instruction of the map database 6 is input by the input device 31 (step #71: Yes), the feature extraction portion 5 extracts one or more target features ft (see FIG. 14) (step #72) suitable for use in the image recognition process of the feature with respect to the image information, based on the feature information F of each feature, from the plurality of the features of which the feature information F is stored in the feature information storage portion 32, depending on instruction content of the creation area included in the creation instruction. The process of the extraction method of the target feature ft by the feature extraction portion 5 is basically similar to the process of the feature extraction method shown in the flowchart of FIG. 5 according to the first embodiment described above. Note that, in this embodiment, the reference feature retrieval unit 52 retrieves the stop line, of which the feature type is the stop line and which is further present on the near (rear) side with respect to the connection portion of the narrow street with the arterial highway, as the reference feature fb (see FIGS. 11 to 14) within the creation area included in the creation instruction input in step #71. Thus, there are cases where a plurality of reference features fb are retrieved. In that case, the extraction of the target feature ft (step #72) for each of the plurality of the reference features fb is repeatedly performed. The process of the step #11 for determining the grouping interval X is not performed. That is, in this embodiment, the grouping interval X is the fixed value. The grouping interval X is preferably set in accordance with an approximate average value of the estimation error which is the estimation value of the error of the current position information separately obtained in the image recognition device or the current position recognition device utilizing the map database 6 created by the feature database creation device 30 according to this embodiment, and may be set as approximately 30 (m), for example. The details of the processes of the feature group formation step (step #14) by the feature group formation unit 53, the exclusion step (step #15) excluding the inappropriate feature by the exclusion unit 54, the feature group re-formation step (step #16) by the feature group re-formation unit 55, the feature set formation step (step #17) by the feature set formation unit 56, and the extraction step (step #18) of the target feature ft by the extraction unit 57 in the feature extraction method are similar to the processes of FIGS. 6 to 10 according to the first embodiment described above.

Next, the feature extraction portion 5 acquires the feature information F of the target feature ft (step #73) extracted in step #72 from the feature information storage portion 32 using the feature information acquisition unit 58. The map extraction portion 16 acquires the map information M of the corresponding region (step #74) depending on the instruction content of the creation area included in the creation instruction input by the input device 31. Then, the map database creation portion 34 associates the feature information F of the target feature ft acquired in step #73 and the map information M acquired in step #74 (step #75), and stores the feature information F associated with the map information M in the map database 6 which also serves as the feature database 40 (step #76). The process of the feature database creation method is thus terminated.

3. Third Embodiment

Figure 17:
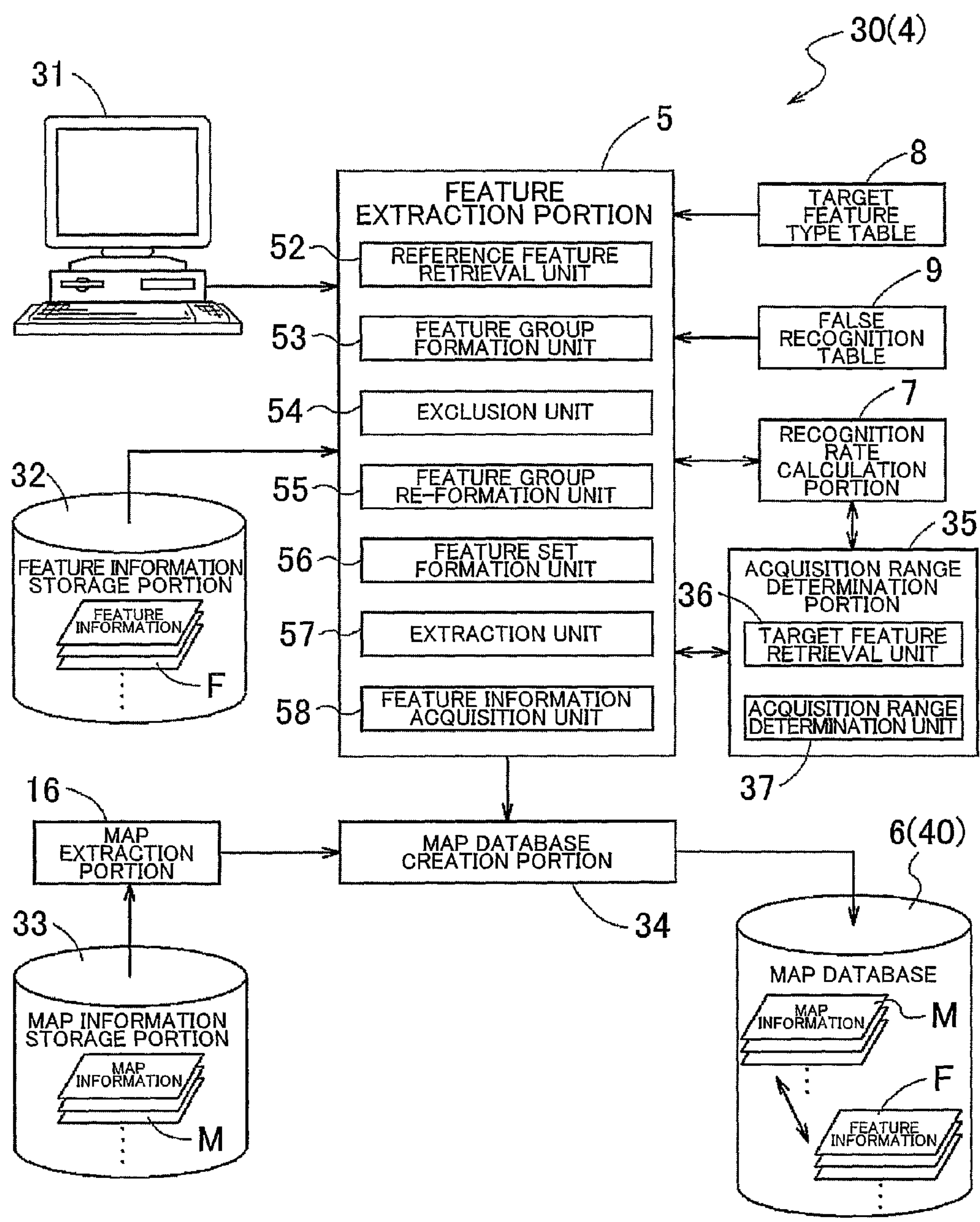
FIG. 17 is a block diagram showing a schematic configuration of a feature database creation device including a feature extraction device according to a third embodiment of the present invention.

Next, a third embodiment of the present invention will be described. FIG. 17 is a block diagram showing a schematic configuration of the feature database creation device 30 including the feature extraction device 4 according to this embodiment. In this embodiment, in a similar manner to that of the second embodiment described above, the feature database creation device 30 creates the map database 6, which also serves as the feature database 40, based on the feature information F stored in the feature information storage portion 32 and the map information M stored in the map information storage portion 33. That is, the feature database creation device 30 extracts one or more target features ft suitable for use in the image recognition process of the feature with respect to the image information, based on the feature information F, from the plurality of the features of which the feature information F including at least the information of the position and the feature type is stored in the feature information storage portion 32, and stores the feature information F acquired based on the extraction result in the map database 6 which also serves as the feature database 40, in a similar manner to that of the second embodiment described above.

However, the feature database creation device 30 according to this embodiment determines an acquisition range of the feature information F based on a recognition rate integrated value which is an integrated value of the recognition rate in the image recognition process for one or more target features ft (see FIG. 14) sequentially retrieved along the road from the predetermined reference feature fb, acquires the feature information F of the feature included in the acquisition range from the feature information storage portion 32, and stores the feature information F in the map database 6. In this regard, it differs from the second embodiment described above in which only the feature information F of the extracted target feature ft is stored in the map database 6. It also differs from the second embodiment described above in that the feature database creation device 30 according to this embodiment includes an acquisition range determination portion 35 for determining the acquisition range of the feature information F based on the extraction result of the target feature ft extracted by the feature extraction portion 5, in order to realize such configuration.

That is, the feature database creation device 30 according to this embodiment determines the acquisition range in the direction along the road from the reference feature fb (see FIG. 14) for acquiring and storing the feature information F, based on the recognition rate integrated value of the target feature ft sequentially arranged along the road from the reference feature fb. Accordingly, in the map database 6, which also serves as the feature database 40, created by the feature database creation device 30, a range of the feature information F to be stored can be made appropriate to reduce a data amount of the feature information F stored in the map database 6, while ensuring that the recognition rate in the image recognition process is greater than or equal to a certain rate, even when the map database 6 is used in the image recognition device which performs the image recognition of the target feature ft, the current position recognition device which corrects the current position information based on the result of the image recognition process of the target feature ft by the image recognition device and the information of the position of the target feature ft included in the feature information F to acquire the highly-accurate current position information. Thus, the map database 6 according to this embodiment can be suitably used as the map database 6 of the navigation apparatus 1 including the image recognition device 2 and the current position recognition device 3 according to the first embodiment described above. Note that other configurations of the feature database creation device 30 according to this embodiment are similar to those of the second embodiment described above. The feature database creation device 30 and a feature database creation method according to this embodiment will be described below in detail focusing on a difference from the second embodiment described above.

The acquisition range determination portion 35 includes a target feature retrieval unit 36 and an acquisition range determination unit 37. The target feature retrieval unit 36 functions as a retrieval unit which sequentially retrieves the target features ft (see FIG. 14) extracted by the feature extraction portion 5 along the road from the reference feature fb retrieved by the reference feature retrieval unit 52. Although a retrieval method of the reference feature fb is similar to that of the first embodiment described above, a retrieval range in this embodiment is within the range of the creation area included in the creation instruction input by the input device 31. The acquisition range determination unit 37 functions as a unit which determines the range of acquisition of the feature information F by the feature information acquisition unit 58 based on the recognition rate integrated value which is the integrated value of the recognition rate in the image recognition process for one or more target features ft retrieved by the target feature retrieval unit 36 from the reference feature fb. In this embodiment, the acquisition range determination unit 37 performs a process of determining a range from the reference feature fb up to a target feature set of which the recognition rate integrated value is greater than or equal to a predetermined threshold value as the acquisition range of the feature information F. The target feature set is the feature set S including the target feature ft, and in the example shown in FIG. 14, the feature sets S1, S3, S4, S5, S6, and S7 are the target feature sets. Note that the recognition rate integrated value is calculated by the recognition rate calculation portion 7. Each unit forming the acquisition range determination portion 35 is formed of the software (program) for operating the arithmetic processing device such as the CPU. The function and the operation of each unit of the acquisition range determination portion 35 will be described later in detail using a flowchart shown in FIG. 18.

In this embodiment, the feature information acquisition unit 58 of the feature extraction portion 5 acquires the feature information F within the acquisition range determined by the acquisition range determination portion 35 from the feature information storage portion 32. The map extraction portion 16 extracts and acquires the map information M corresponding to the region instructed by the creation instruction input by the input device 31 from the map database 6. The map database creation portion 34 creates the data in which the feature information F extracted and acquired by the feature extraction portion 5 and the map information M acquired by the map extraction portion 16 are associated, and stores the data in the map database 6. Thus, in this embodiment as well, the map database creation portion 34 functions, as the storage processing unit which stores the feature information F acquired by the feature information acquisition unit 58 in the predetermined storage unit, and the map database 6 corresponds to the predetermined storage unit of the present invention that stores the feature information F.

Figure 18:
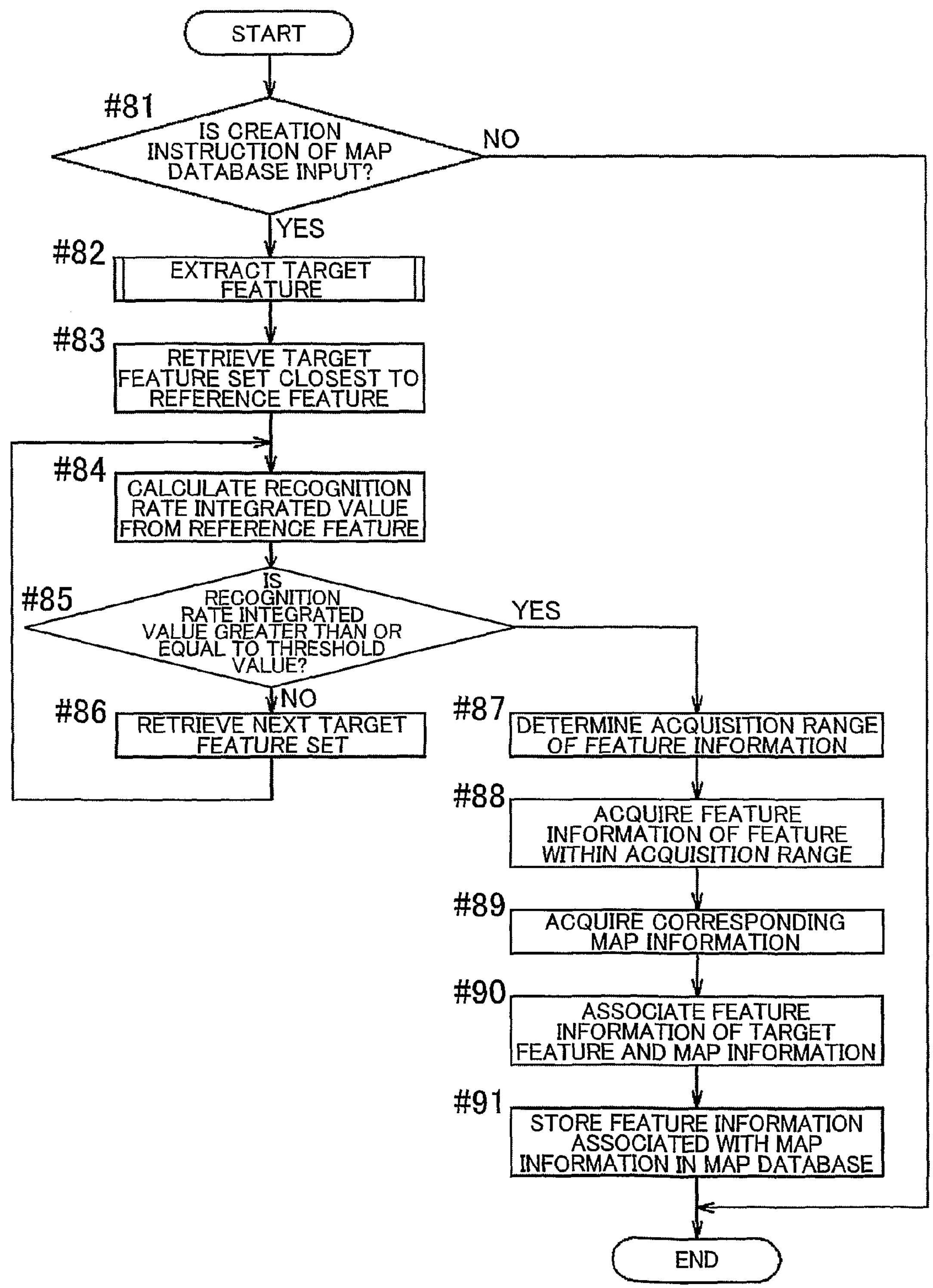
FIG. 18 is a flowchart showing a processing order of a feature database creation method according to the third embodiment of the present invention.

Next, the feature database creation method including the feature extraction method, which is executed in the feature database creation device 30 according to this embodiment, will be described. FIG. 18 is a flowchart showing the processing order of the feature database creation method according to this embodiment. Note that FIG. 14 is to be referenced in the description below as necessary.

As shown in FIG. 18, when the creation instruction of the map database 6 is input by the input device 31 (step #81: Yes), the feature extraction portion 5 extracts one or more target features ft (see FIG. 14) (step #82) suitable for use in the image recognition process of the feature with respect to the image information, based on the feature information F of each feature, from the plurality of the features of which the feature information F is stored in the feature information storage portion 32, depending on the instruction content of the creation area included in the creation instruction. The extraction method of the target feature ft by the feature extraction portion 5 is similar to that of the second embodiment described above. Next, the target feature retrieval unit 36 of the acquisition range determination portion 35 retrieves the target feature set closest to the reference feature fb (step #83). As described above, the target feature set is the feature set S including the target feature ft. In the example shown in FIG. 14, the feature set S1 including the feature 13 as the target feature ft is retrieved as the target set closest to the reference feature fb.

Next, the recognition rate calculation portion 7 calculates the recognition rate integrated value from the reference feature fb (step #84). The recognition rate integrated value is the integrated value of the recognition rate of one or more feature sets S extracted along the road from the reference feature fb. Specifically, for example, a recognition rate integrated value Q of the recognition rate of n feature sets S, of which the recognition rates are R1, R2, . . . Rn (n is a natural number), from the reference feature fb is obtained by the following formula (3).

$$Q=1-(1-R1)\times(1-R2)\times \ldots \times(1-Rn) \quad (3)$$

The recognition rate R of the feature set S is obtained by the formula (2) described above. As described above, since the recognition coefficients C1, C2, . . . Cn of each feature f are all set as a value between 0 and 1, the recognition rates R1, R2, . . . Rn of each feature set S are also values between 0 and 1, respectively. Thus, the recognition rate integrated value Q becomes a greater value (value closer to 1) as the number of the feature sets S becomes larger. In a state right after the target feature set closest to the reference feature fb is retrieved in step #83, only one feature set S is retrieved, whereby the recognition rate integrated value Q coincides with the recognition rate of the feature set S. In the example shown in FIG. 14, since the feature set S1 is retrieved as the target feature set closest to the reference feature fb at this point, the recognition rate integrated value Q is shown as Q=R1 according to the formula (3) described above, when the recognition rate of the feature set S1 is shown as R1.

Next, the acquisition range determination unit 37 of the acquisition range determination portion 35 determines whether the recognition rate integrated value Q is greater than or equal to the predetermined threshold value (step #85). The recognition rate integrated value Q corresponds to a probability of the image recognition of the target feature ft succeeding before the vehicle reaches the reference feature fb, when the map database 6 according to this embodiment is used for the image recognition device 2 or the like according to the first embodiment described above. Thus, when the map database 6 is used for the image recognition device 2 or the like, a success rate of the image recognition process can be increased as the predetermined threshold value of the recognition rate integrated value Q increases. Thus, the threshold value is preferably set as a value between 0.90 and 0.99, for example. When the recognition rate integrated value Q is smaller than the predetermined threshold value (step #85: No), the next target feature set is retrieved (step #86), and the process returns to step #84. The target feature set is sequentially retrieved (step #86) in a direction departing from the reference feature fb until the recognition rate integrated value Q is greater than or equal to the predetermined threshold value (step #85: Yes), and the recognition rate integrated value Q is calculated (step #84). When the recognition rate integrated value Q is greater than or equal to the predetermined threshold value (step #85: Yes), the process proceeds to the next step #87.

In the example shown in FIG. 14, the feature set S3 is retrieved as the target feature set following the feature set S1, and the recognition rate integrated values Q of the feature sets S1 and S3 are calculated by the recognition rate calculation portion 7. When the recognition rate R1 of the feature set S1 is 0.9 and the recognition rate R2 of the feature set S3 is 0.6, the recognition rate integrated value Q is shown as $Q=1-(0.1\times0.4)=0.96$. When the threshold value is set to 0.98, the recognition rate integrated value Q is smaller than the threshold value. In that case, the feature set S4 is further retrieved as the following target feature set, and the recognition rate integrated value Q is calculated. When the recognition rate R3 of the feature set S4 is 0.8, the recognition rate integrated value Q is shown as $Q=1-(0.1\times0.4\times0.2)=0.992$, and is greater than the threshold value 0.98. Thus, the process proceeds to the next step #87.

Next, the acquisition range determination unit 37 of the acquisition range determination portion 35 determines the acquisition range of the feature information F (step #87). That is, the acquisition range determination unit 37 determines the range from the reference feature fb up to the target feature set of which the recognition rate integrated value Q is greater than or equal to the predetermined threshold value as the acquisition range of the feature information F. Specifically, as the feature f within the acquisition range, all of the features f which are present between the reference feature fb and the rearmost feature of the target feature set, of which the recognition rate integrated value Q is greater than or equal to the predetermined threshold value, are included. In this example, the feature f excluded in the exclusion step (step #15) by the exclusion unit 54 is also included. The feature extraction portion 5 acquires the feature information F of the feature f included in the acquisition range (step #88) determined in step #87 from the feature information storage portion 32 using the feature information acquisition unit 58. The map extraction portion 16 acquires the map information M of the corresponding area (step #89) according to the instruction content of the creation area included in the creation instruction input by the input device 31. Then, the map database creation portion 34 associates the feature information F of the target feature ft acquired in step #88 and the map information M acquired in step #89 (step #90), and stores the feature information F associated with the map information M in the map database 6 which also serves as the feature database 40 (step #91). Note that, when the plurality of the features as possible reference features fb are present within the creation area included in the creation instruction of the map database 6 input by the input device 31, the process described above is repeatedly performed for the following reference feature fb.

When the process is terminated for all of the reference features fb, the process of the feature database creation method is terminated.

4. Other Embodiments (1) In each embodiment described above, the example has been described of the case where the feature group re-formation step (step #16) by the feature group re-formation unit 55 and the feature set formation step (step #17) by the feature set formation unit 56 are performed after the exclusion step (step #15) by the exclusion unit 54. However, the feature group re-formation step (step #16) and the feature set formation step (step #17) are not requisites for the feature extraction method according to the present invention, and a preferred embodiment of the present invention may not include these steps. In this case, the extraction step (step #18) by the extraction unit 57 may be such that a part of one or more features f within the feature group G remaining as the result of the exclusion step (step #15) is selected based on the recognition rate and the like in the image recognition process to extract the target feature ft, or all of the one or more features f within the feature group G are extracted as the target feature ft. When the feature extraction method has such configuration, the feature extraction device 4 may not include the feature group re-formation unit 55 and the feature set formation unit 56.

(2) In each embodiment described above, the example has been described of the case where the exclusion unit 54 of the feature extraction portion 5 determines whether the plurality of the features have the possibility of being falsely recognized with each other by whether the information of the combination of the feature types which have the possibility of being falsely recognized with each other is stored in the false recognition table 9. However, a method of determining whether the plurality of the features have the possibility of being falsely recognized with each other is not limited thereto. Thus, for example, it is possible that the exclusion unit 54 perform an arithmetic process of determining similarity of the figuration of the feature each time based on the figuration information included in the feature information F of each feature.

(3) In each embodiment described above, the example has been described of the case where the exclusion unit 54 of the feature extraction portion 5 determines to exclude the feature f of the feature type with the lower recognition rate in the image recognition process, regarding the combination of the feature types which have the possibility of being falsely recognized with each other based on the false recognition table 9. However, a method of determining which of the plurality of the features, which have the possibility of being falsely recognized with each other, to exclude is not limited thereto. Thus, for example, a preferred embodiment of the present invention may be such that the recognition rate calculation portion 7 calculates the recognition rate of each feature and excludes the feature with the lower recognition rate based on the result. It is also possible that the one of the plurality of the features which have the possibility of being falsely recognized with each other is excluded based on an index other than the recognition rate in the image recognition process.

(4) In each embodiment described above, the example has been described of the case where the grouping interval X is determined depending on the estimation error which is the estimation value of the error of the current position information and the case where the grouping interval X is the fixed value. However, the determination method of the grouping interval X as the reference in forming the feature group G is not limited thereto, and it is also possible that the grouping interval X is determined as a variable value by another method.

(5) The calculation method of the estimation error E in the first embodiment described above is merely one example, and a method of calculating the estimation error E of the current position information is not limited to the calculation method described above. Thus, for example, a preferred embodiment of the present invention may have a configuration in which the estimation error E is obtained by adding an error caused by another factor such as a course change in addition to the distance factor error and the fixed factor error described above.

(6) In the third embodiment described above, the example has been described of the case where the recognition rate in the image recognition process and the recognition rate integrated value are calculated with the feature set S as a unit, and the feature information F of the feature up to the feature set S, of which the recognition rate integrated value from the reference feature becomes greater than or equal to the predetermined threshold value, is acquired from the feature information storage portion 32. However, a configuration of the feature database creation method according to the present invention is not limited thereto. That is, a preferred embodiment of the present invention may have a configutaion in which the recognition rate in the image recognition process and the recognition rate integrated value are calculated with the target feature ft as a unit, and the feature information F of the feature up to the target feature ft, of which the recognition rate integrated value from the reference feature becomes greater than or equal to the predetermined threshold value, is acquired from the feature information storage portion 32.

(7) In the first embodiment described above, the example has been described of the case where all configurations of the navigation apparatus 1 including the feature extraction device 4, the image recognition device 2, and the current position recognition device 3 are mounted in the vehicle. However, an application range, of the present invention is not limited to such configuration. That is, for example, a preferred embodiment of the present invention may have a configutaion in which a part of the configuration excluding the image-taking device 21 is provided outside the vehicle in a connected state via a communication network such as the Internet, and the feature extraction device 4, the image recognition device 2, the current position recognition device 3, and the navigation apparatus 1 transmit and receive information and signals via the network.

(8) In each embodiment described above, the example has been described of the case where the image recognition device 2 including the feature extraction device 4 according to the present invention is utilized for the current position recognition device 3 of the navigation apparatus 1. However, the application range of the present invention is not limited thereto, and the image recognition device 2 including the feature extraction device 4 according to the present invention or the current position recognition device 3 using the same may obviously be utilized for other applications, such as a vehicle control device utilized for a travel control and the like of a vehicle.

INDUSTRIAL APPLICABILITY

The present invention can be used for an image recognition method, a current position recognition method, and the like using feature information. Further, the present invention can suitably be utilized for an image recognition device, a current position recognition device, a navigation apparatus, a vehicle control device, and the like utilizing the methods.

The invention claimed is:

1. A computer-readable medium storing instructions for causing a computer to perform a feature extraction method comprising:

grouping a cluster of features, in which an interval of the respective adjacent features is less than or equal to a predetermined grouping interval, to form a feature group, for a plurality of features regarding a road marking of which feature information including at least information of a position of a feature and information of a feature type representing a type of the feature is stored in a predetermined feature information storage unit;

excluding, based on the feature information, a feature not suitable for use in an image recognition process of the feature with respect to image information, from the cluster of the features within the feature group; and extracting a part or all of one or more of the features within the feature group remaining as a result of the excluding, as a target feature suitable for the use in the image recognition process.

2. The computer-readable medium according to claim 1, the feature extraction method further comprising:

re-forming a feature group between the excluding and the extracting, the re-forming including: grouping the cluster of the features, in which the interval of the respective adjacent features is less than or equal to the predetermined grouping interval, to form a new feature group and forming a new feature group individually for each feature which has not been grouped, for one or more of the features within the feature group remaining as the result of the excluding, a part or all of one or more of the features within the feature group formed at the re-forming being extracted as the target feature at the extracting.

3. The computer-readable medium according to claim 2, the feature extraction method further comprising:

forming a feature set between the re-forming and the extracting, the forming including: forming the cluster of the features, in which the interval of the respective adjacent features is less than or equal to the predetermined grouping interval, of the same feature type into a set as a feature set and forming a feature set individually for each feature which has not been formed into the set, for one or more of the features within the feature group formed at the forming or the re-forming, as the feature set, one feature set being selected from within the feature group formed at the forming or the re-forming, and one or more of the features forming the selected feature set being extracted as the target feature at the extracting.

4. The computer-readable medium according to claim 3, wherein, when the feature set present within the feature group includes a plurality of sets, a feature set which is highest in a recognition rate in the image recognition process is selected from the sets at the extracting.

5. The computer-readable medium according to claim 1, wherein, when a plurality of features, which are of different feature types and have a possibility of being falsely recognized with each other, are present, the excluding includes excluding a false recognition feature for excluding a feature of at least one of the feature types from the feature group, as the feature not suitable for the use in the image recognition process.

6. The computer-readable medium according to claim 5, wherein, of the features of the feature types, at least a feature of a feature type which is lower in the recognition rate in the image recognition process is excluded from the feature group at the excluding of the false recognition feature.

7. The computer-readable medium according to claim 1, wherein the feature information includes the information of the position of the feature and information of a feature attribute, the information of the feature attribute being information including at least a state of the feature in addition to the information of the feature type, and the excluding includes excluding a non-target feature for excluding, from the feature group, a feature having a feature attribute previously defined as a non-target of extraction, as the feature not suitable for the use in the image recognition process.

8. The computer-readable medium according to claim 1, wherein, when all of the features within the feature group are excluded as the result of the excluding, all of the features within the feature group are extracted as the target feature at the extracting.

9. The computer-readable medium according to claim 1, wherein a feature group is formed individually for each feature, which has not been grouped, at the forming of the feature group, and the feature not suitable for the use in the image recognition process of the feature with respect to image information is also excluded from the feature group individually formed for each feature at the excluding.

10. The computer-readable medium according to claim 1, wherein a feature of which a feature type is a stop line is a reference feature, and a process of sequentially retrieving an adjacent feature along a road from the reference feature to form the feature group is performed at the forming of the feature group.

11. The computer-readable medium according to claim 10, wherein a feature within a predetermined non-extraction-target range from the reference feature is not retrieved at the forming of the feature group.

12. The computer-readable medium according to claim 1, wherein the grouping interval is determined according to an estimation error which is an estimation value of an error of current position information obtained separately.

13. The computer-readable medium according to claim 1, the feature extraction method further comprising:

acquiring image information of the vicinity of a current position;

acquiring current position information;

acquiring feature information of the target feature extracted at the extracting from the feature information storage unit; and performing the image recognition process of the target feature with respect to the image information using the feature information of the target feature acquired at the acquiring of the feature information.

14. The computer-readable medium according to claim 1, the feature extraction method further comprising:

acquiring the feature information of the target feature extracted at the extracting from the feature information storage unit; and storing the feature information acquired at the acquiring of the feature information in a predetermined storage unit.

15. The computer-readable medium according to claim 1, the feature extraction method further comprising:

sequentially retrieving the target feature extracted at the extracting along the road from a predetermined reference feature;

calculating a recognition rate integrated value which is an integrated value of the recognition rate in the image recognition process of one or more of the target features, retrieved at the retrieving, from the reference feature;

acquiring feature information of a feature up to the target feature, of which the recognition rate integrated value from the reference feature becomes greater than or equal to a predetermined threshold value, from the feature information storage unit; and storing the feature information acquired at the acquiring of the feature information in a predetermined storage unit.

16. The computer-readable medium according to claim 15, wherein, when the feature extraction method includes the forming of the feature set, the recognition rate and the recognition rate integrated value are calculated with the feature set as a unit at the calculating of the recognition rate, and the feature information of the feature up to the feature set, of which the recognition rate integrated value from the reference feature becomes greater than or equal to the predetermined threshold value, is acquired from the feature information storage unit at the acquiring of the feature information.

17. A feature database creation device comprising:

a feature group formation unit which groups a cluster of features, in which an interval of the respective features is less than or equal to a predetermined grouping interval, to form a feature group, for a plurality of features of which feature information including at least information of a position and a feature type is stored in a predetermined feature information storage unit;

an exclusion unit which excludes a feature not suitable for use in an image recognition process of the feature with respect to image information, from the cluster of the features within the feature group; and an extraction unit which extracts a part or all of one or more of the features within the feature group remaining as a result of a process performed by the exclusion unit as a target feature suitable for the use in the image recognition process;

a retrieval unit which sequentially retrieves the target feature extracted by the extraction unit along a road from a predetermined reference feature;

a recognition rate calculation unit which calculates a recognition rate integrated value which is an integrated value of a recognition rate in the image recognition process of one or more of the target features, retrieved by the retrieval unit, from the reference feature;

a feature information acquisition unit which acquires feature information of a feature up to the target feature, of which the recognition rate integrated value from the reference feature becomes greater than or equal to a predetermined threshold value, from the feature information storage unit; and a storage processing unit which stores the feature information acquired by the feature information acquisition unit in a predetermined storage unit.

18. A method of creating a feature database comprising:

grouping, with a processor, a cluster of features, in which an interval of the respective features is less than or equal to a predetermined grouping interval, to form a feature group, for a plurality of features of which feature information including at least information of a position and a feature type is stored in a predetermined feature information storage unit;

excluding, with the processor, a feature not suitable for use in an image recognition process of the feature with respect to image information, from the cluster of the features within the feature group; and extracting, with the processor, a part or all of one or more of the features within the feature group remaining as a result of the excluding, as a target feature suitable for the use in the image recognition process;

sequentially retrieving, with the processor, the target feature extracted as a result of the extracting along a road from a predetermined reference feature;

calculating, with the processor, a recognition rate integrated value which is an integrated value of a recognition rate in the image recognition process of one or more of the target features, retrieved as a result of the retrieving, from the reference feature;

acquiring, with the processor, feature information of a feature up to the target feature, of which the recognition rate integrated value from the reference feature becomes greater than or equal to a predetermined threshold value, from the feature information storage unit; and storing, with the processor, the feature information acquired as a result of the acquiring in a predetermined storage unit.

* * * * *